(12) United States Patent
Bothwell et al.

(10) Patent No.: US 9,501,799 B2
(45) Date of Patent: Nov. 22, 2016

(54) SYSTEM AND METHOD FOR DETERMINATION OF INSURANCE CLASSIFICATION OF ENTITIES

(71) Applicant: Hartford Fire Insurance Company, Hartford, CT (US)

(72) Inventors: Peter T. Bothwell, Windsor, CT (US); Zhe Zhu, Toronto (CA)

(73) Assignee: Hartford Fire Insurance Company, Hartford, CT (US)

( * ) Notice: Subject to any disclaimer, the term of this patent is extended or adjusted under 35 U.S.C. 154(b) by 601 days.

(21) Appl. No.: 14/022,448

(22) Filed: Sep. 10, 2013

(65) Prior Publication Data
US 2014/0129261 A1   May 8, 2014

Related U.S. Application Data

(60) Provisional application No. 61/724,109, filed on Nov. 8, 2012.

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC ...... G06Q 10/00; G06Q 20/00; G06Q 30/00; G06Q 40/00
USPC ...................................... 705/3–44
See application file for complete search history.

(56) References Cited

U.S. PATENT DOCUMENTS

| 5,855,005 A * | 12/1998 | Schuler ................. G06Q 40/08 705/4 |
| 5,884,275 A | 3/1999 | Peterson et al. |
| 6,026,364 A * | 2/2000 | Whitworth ......... G06Q 30/0283 705/35 |
| 6,148,289 A | 11/2000 | Virdy |
| 7,319,970 B1 * | 1/2008 | Simone ................. G06F 19/328 434/262 |
| 7,376,618 B1 | 5/2008 | Anderson et al. |
| 7,613,687 B2 | 11/2009 | Nye |
| 7,813,944 B1 | 10/2010 | Luk et al. |
| 7,831,451 B1 | 11/2010 | Morse et al. |
| 7,877,279 B1 * | 1/2011 | Sturgis ............... G06Q 30/0203 434/322 |

(Continued)

FOREIGN PATENT DOCUMENTS

WO    WO2004088476 A2    10/2004

OTHER PUBLICATIONS

Rodriguez et al., "Rotation Forest: A New Classifier Ensemble Method", IEEE Transactions on Pattern Analysis and Machine Intelligence, Oct. 2006, pp. 1619-1630, vol. 28, No. 10, IEEE Computer Society.

*Primary Examiner* — Frantzy Poinvil
(74) *Attorney, Agent, or Firm* — Howard IP Law Group, PC

(57) ABSTRACT

Systems and methods are disclosed herein for determining an insurance evaluation based on an industrial classification. The system may be configured to receive an electronic resource address relating to an entity, access data relating to the entity using the electronic resource address, tokenize the data, generate token counts based on the tokenized data; and apply at least one computerized predictive model to the token counts to determine one or more classifications associated with the entity. The system may further be configured to conduct evaluations of insurability, fraud determinations and other processes using the determined classification(s).

20 Claims, 22 Drawing Sheets

(56) References Cited

U.S. PATENT DOCUMENTS

| | | | |
|---|---|---|---|
| 8,392,222 B1 | 3/2013 | Seybold et al. | |
| 8,554,584 B2 * | 10/2013 | Hargroder | G06Q 10/10 |
| | | | 705/4 |
| 8,660,864 B2 | 2/2014 | Krause et al. | |
| 8,892,452 B2 * | 11/2014 | Virdhagriswaran | G06Q 10/067 |
| | | | 705/35 |
| 2002/0055862 A1 | 5/2002 | Jinks | |
| 2002/0111835 A1 | 8/2002 | Hele et al. | |
| 2003/0031232 A1 | 2/2003 | Shi et al. | |
| 2003/0125990 A1 | 7/2003 | Rudy et al. | |
| 2003/0187703 A1 | 10/2003 | Bonissone et al. | |
| 2005/0071168 A1 | 3/2005 | Juang et al. | |
| 2007/0038485 A1 * | 2/2007 | Yeransian | G06Q 40/08 |
| | | | 705/4 |
| 2008/0183508 A1 | 7/2008 | Harker et al. | |
| 2010/0228573 A1 | 9/2010 | Quinlan et al. | |
| 2012/0290330 A1 * | 11/2012 | Coleman | G06Q 40/00 |
| | | | 705/4 |
| 2012/0303389 A1 | 11/2012 | Friedman | |
| 2013/0013345 A1 | 1/2013 | Wallquist et al. | |
| 2014/0114698 A1 * | 4/2014 | Virdhagriswaran | G06Q 10/10 |
| | | | 705/4 |
| 2014/0330594 A1 * | 11/2014 | Roberts | G06Q 40/08 |
| | | | 705/4 |
| 2016/0012540 A1 * | 1/2016 | Pelta | G06Q 40/08 |
| | | | 705/4 |

* cited by examiner

| Commercial Underwriting Program | | |
|---|---|---|
| SIC Code (702) | Description (704) | Confidence Level (706) |
| 1761 | Roofing, Siding, and Sheet Metal Work | 90% |
| 1521 | General Contractors – Single-Family Homes | 15% |
| 1522 | General Contractors – Residential Buildings | 15% |
| 8741 | Management Services | 10% |
| 1743 | Terrazzo, Tile, Marble, and Mosaic Work | 5% |

SYSTEM AND METHOD FOR DETERMINATION OF INSURANCE CLASSIFICATION OF ENTITIES

CROSS-REFERENCE TO RELATED APPLICATIONS

This application claims the benefit of U.S. Provisional Patent Application No. 61/724,109, filed Nov. 8, 2012, the entire disclosure of which is incorporated by reference herein for all purposes.

FIELD OF THE INVENTION

In general, the invention relates to a computerized system and method for determining an industrial classification of an entity. More specifically, the invention relates to a computerized system and method which uses a computerized predictive model to determine an industrial classification, which is used to determine an insurance evaluation of an entity for pricing and other applications.

BACKGROUND OF THE INVENTION

In performing insurance processes, such as generating quotes for coverage, an insurance company uses a number of factors. One of the factors used in quoting and other insurance processes for insurance provided to businesses and non-profit entities is the industrial classification of the entity. The industrial classification of an entity is an important factor in determining insurance risk. There are many standardized industrial classification systems, such as Standard Industrial Classification (SIC), North American Industrial Classification System (NAICS), Global Industry Classification System (GICS), Industrial Classification Benchmark (ICB), Thomson Reuters Business Classifications (TRBC), Statistical Classification of Economic Activities (NACE), Australian and New Zealand Standard Industrial Classifications (ANZSIC), and International Standard Industrial Classifications (ISIC). Many of these are multi-digit code systems, wherein each digit, reading from left to right, specifies an entity's sector more specifically. For example, in the four-digit ICB, the first digit indicates industry, the second digit plus the first digit specify a supersector, the first three digits indicates sector, and the full four digits specify a subsector. There are also numerous custom industrial classification systems used by entities, such as insurers.

Current methods for aligning entities with appropriate industries are error prone. In some cases, the operations of an entity are too varied to neatly fit into one or two industrial classifications, causing activities of the entity to be ignored when an insurance quote is being determined. In other cases, the industrial code assigned to an entity is too general for assigning an accurate risk factor. For large and established companies, a third party data vendor may supply an industrial classification, or an industrial classification may be provided by an agent, but for new or small companies, third party vendors may not have an industrial classification available. In these cases, the burden of classifying the industry falls onto the entity itself or the agent. The assigned industrial classification selected by the agent or entity may be incorrect or inadequate. Insurance companies produce hundreds of thousands of insurance quotes per year, so it is impossible for insurance companies to verify the accuracy of industrial classifications received from agents, insureds and third party vendors for each entity they develop a quote for.

For these reasons, an industrial classification assigned to an entity may not accurately represent the entity's operation, leading to economic consequences for the insurance company. For example, a company that sells appliances may also employ an installation team to install the appliances. The activities involved in installation, from transporting the appliances to handling them in an unfamiliar setting, are much riskier than activities on a retail floor or in a warehouse. Furthermore, the entity may be liable for any accidents damaging the appliances or the installation site. While the entity may be truthfully classified as an appliance retailer, if the entity is paying an insurance premium that has been determined for an appliance retailer without taking into account the installation aspect of the business, the insurer of the appliance company runs the risk of the appliance company incurring greater losses than were expected or insured. In cases like this, the insurance company is typically still contractually bound to cover the losses under the policy.

SUMMARY

There is therefore a need in the insurance industry for a system and method for more accurately determining an industrial classification of an entity, and verifying a received industrial classification for an entity. Electronic resources maintained by entities, such as websites, social media pages and feeds, and other available data, such as third party data in advertising and rating websites, business directories, and other electronic resources, along with data scraping methods can be used to solve this problem. The systems and methods disclosed herein leverage available electronic resources, such as websites and social media pages, maintained by entities or related to the entities, as well as third party electronic resources, to determine one or more likely industrial classifications for the entity. This computer-generated classification has a wide range of applications, such as identifying a risk factor of the entity, identifying additional information needed from the entity for setting a premium price, setting a premium price, and determining the truthfulness of the representative applying for insurance and/or the agent preparing the application. The computer-generated classification may provide data particular to insurance evaluation needs, and may serve as an insurance classification. In addition, data extracted from such electronic resources may be analyzed for other insurance purposes, such as identification of words and phrases that may indicate a particular risk associated with the entity.

Accordingly, systems and methods are disclosed herein for determining and verifying an insurance evaluation based on an industrial classification or an insurance classification. In embodiments, a system for making an insurance evaluation includes one or more computer processors configured to: retrieve, from an electronic resource, data indicative of content related to an entity seeking an insurance policy; tokenize the retrieved data; generate token count data based on the tokenized data and store the token count data in one or more data storage devices in communication with the one or more computer processors; execute a computerized predictive model by: processing the token count data using the computerized predictive model; and outputting, based on the processing, first data indicative of at least one industrial classification and second data indicative of a likelihood of the industrial classification being associated with the entity.

In embodiments, a computerized method for performing an insurance process includes: receiving by one or more computer processors an electronic resource address related to an entity; retrieving by the one or more computer processors content available at the electronic resource address and storing the retrieved content in one or more data storage devices; tokenizing by the one or more computer processors the content; generating by the one or more computer processors token count data based on the tokenizing; applying, by the one or more computer processors, a computerized predictive model to the token count data to determine first data indicative of at least one industrial classification associated with the entity and second data indicative of a confidence level associated with the at least one industrial classification; outputting for display on a user device the first data and a user prompt for confirmation of at least one of the one or more industrial classifications; and receiving user confirmation of one of the one or more industrial classifications associated with the entity.

In some embodiments, a non-transitory computer readable medium has stored therein instructions for, upon execution, causing a processor to implement a method for performing an insurance process comprising: obtaining an electronic resource address related to an entity; retrieving content published on the electronic resource; tokenizing the content; generating token count data based on the tokenizing; processing by one or more computerized predictive models the token count data to determine at least first data indicative of one or more industrial classifications associated with the entity and second data indicative of a likelihood associated with each of the one or more industrial classifications; and outputting the first data and the second data.

In some embodiments, the system includes a content processor, a computerized predictive model, and a business logic processor. The content processor retrieves content from a website related to an entity seeking an insurance policy and extracts data from the website content. The computerized predictive model accepts the data extracted from the website content from the content processor, processes the extracted data, and outputs data indicative of at least one industrial classification associated with the entity. The business logic processor determines an insurance evaluation of the entity based on its industrial classification(s). The insurance evaluation may be at least one of an insurance risk, and insurance price, a level of underwriting necessary, and an actuarial class.

In some embodiments, the computerized predictive model has been trained on industrial classification data related to entities associated with the contents of a plurality of websites. The computerized predictive model may be further trained by industrial classification-related data extracted from the contents of an insurance claims database. The predictive model may determine a confidence rating or probability for each industrial classification representing how well each industrial classification describes the entity. The business logic processor may determine whether to output an industrial classification based on whether the confidence rating for the industrial classification is above a threshold value. A second predictive model may be use to determine the size of the entity from website content.

In some embodiments, the business logic processor identifies additional information to be obtained based on the at least one industrial classification returned. The business logic processor may determine a set of questions to ask an insurance applicant based on at least one confidence rating, and responses to the questions may be used to determine a suitable industrial classification for the entity.

In some embodiments, the website content comprises at least one image, and the content processor is configured to process the image to be accepted by the predictive model for processing and outputting an industrial classification.

In some embodiments, the business logic processor displays the at least one industrial classification using an insurance application processing system, outputs the at least one industrial classification to an underwriting system, or outputs the at least one industrial classification to a claims processing system. The business logic processor may adjust the price of an insurance premium for the entity based on the insurance evaluation of the entity as determined based on the entity's industrial classification. The business logic processor may compare an industrial classification indicated by the predictive model to a classification obtained from at least one of the entity, an agent, or a third party.

In some embodiments, a single processor is configured to perform the functions of at least two of the content processor, the computerized predictive model, and the business logic processor. The system may also include a quote generation processor for generating an insurance quote.

In an embodiment, a processor executing instructions in a software-implemented user front end prompts a user to input a website address of the customer. Responsive to receiving the website address, the processor causes data from the website corresponding to the web address to be obtained. The obtained data may include data from a home page of the website and one or more additional levels, and may include only text, or text and additional data such as graphics data. The data may be tokenized, and token counts generated from the tokenized website data. In embodiments, a listing of tokens, or words that are determined to have significance in determining industrial classification, may be employed. The token count data may be structured as known in the text mining field and furnished to the computerized predictive model for analysis. The model will then determine one or more of the most likely industrial classifications for the customer, and the system causes the one or more industrial classifications to be displayed on the software-implemented user front end on a user device. In embodiments, the system may display two or more of the most likely industrial classifications and provide a prompt for a user to select a correct classification from the displayed classifications.

The system may be configured using software to display on a user device an option for a user to provide feedback based on the identified classifications. By way of example, the user may have an option to indicate that none of the identified candidate classifications are correct.

In embodiments, the computerized predictive model may operate in real time, so that results are returned in real time to system users, such as insurance agents and underwriters and other insurance company personnel. In embodiments, the system may be configured to perform classification determination using the predictive model in batch mode.

According to another aspect, the invention relates to computerized methods for carrying out the functionalities described above. According to another aspect, the invention relates to non-transitory computer readable medium having stored therein instructions for causing a processor to carry out the functionalities described above.

BRIEF DESCRIPTION OF THE DRAWINGS

FIG. 7 is a diagram of a graphical user interface for displaying industrial classifications determined by a computerized predictive model, according to an illustrative embodiment of the invention.

FIG. 13 shows an exemplary screen shot relating to data usable in connection with embodiments of the invention.

FIG. 21 shows an excerpt of a decision tree used in an exemplary web-based industry classifier system.

DESCRIPTION OF CERTAIN ILLUSTRATIVE EMBODIMENTS

To provide an overall understanding of the invention, certain illustrative embodiments will now be described, including systems and methods for web-based industrial classification. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The term "predictive model" as used herein includes any rules or technique using statistical techniques for using a computer to determining a probable or most likely one of a set of possible outputs or values, based on input data. Predictive models are typically created by applying suitable algorithms to sets of data having known results, identified as training data, and then testing resulting predictive models against a set of similar data. Predictive models may be understood as heuristic techniques for determining classifications based on input data. Examples of predictive models include the rotation forest and random forest technique, other classification trees, and other classification model types, such as naïve Bayesian models, Bayesian network models, K-Nearest neighbor models and support vector machines.

Figure 1:
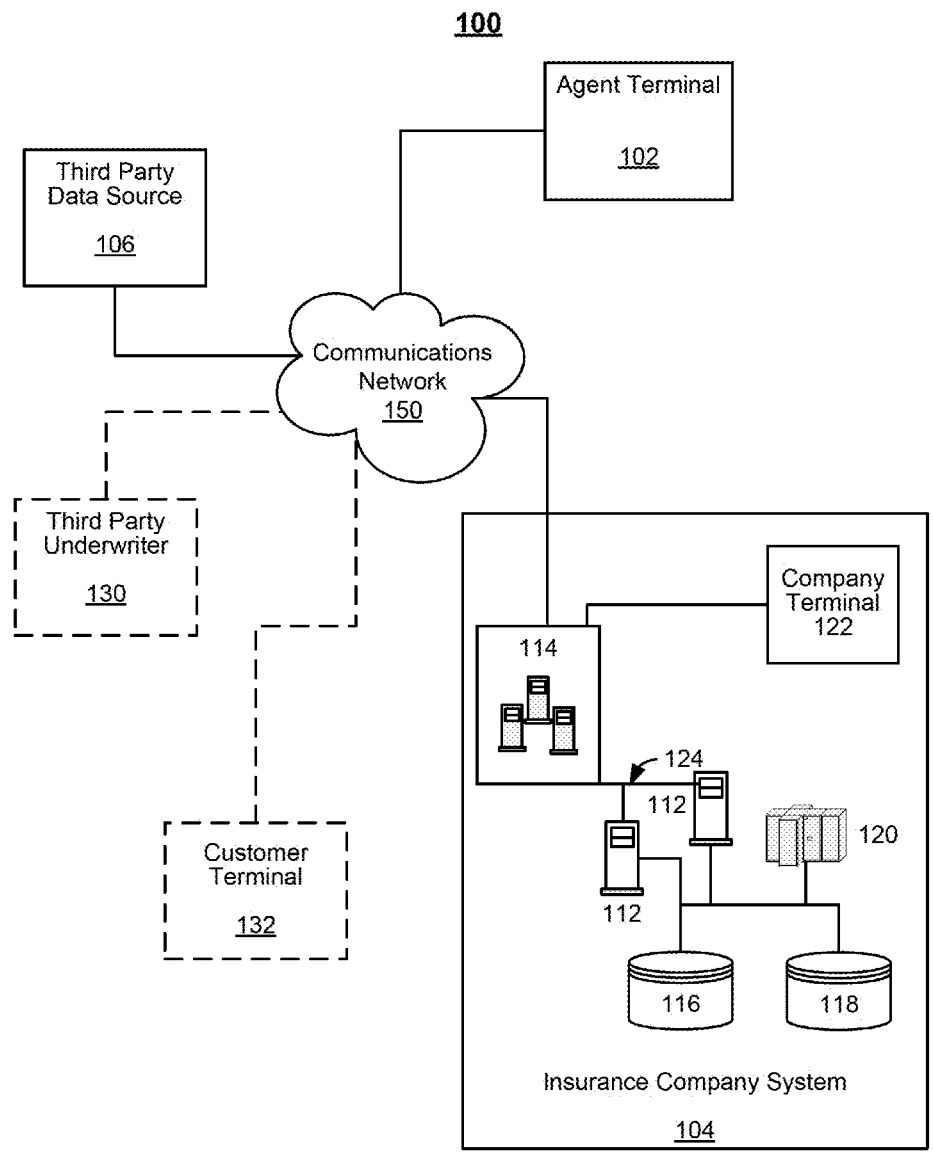
FIG. 1 is an architectural model of a system for determining an industrial classification by an insurance company, according to an illustrative embodiment of the invention.

FIG. 1 is a block diagram of a system 100 for making an insurance evaluation, including determining or verifying one or more likely industrial classifications of an entity by an insurance company, according to an illustrative embodiment. The system 100 uses a computerized predictive model to identify at least likely one industrial classification of an entity seeking an insurance policy based on content related to the entity and retrieved from a website. The computerized predictive model is any model configured to try to best predict the probability of an outcome (i.e. one or more likely industrial classifications for the entity). An insurance company uses a determined industrial classification in an insurance determination relating to the entity. The insurance determination may include in embodiments determining whether to provide a quote, determining which risks to underwrite, setting or adjusting a price of an insurance premium, setting or adjusting premiums and other insurance quote and policy terms, and other insurance purposes. In embodiments, the insurance determinations may be determined by one or more computer systems. In other embodiments, one or more steps in the insurance determinations may be made by an insurance professional such as an underwriter; for example, a computer system may generate one or more insurance recommendations which may be adjusted or overridden by an underwriter, or an underwriter may determine one or more insurance determinations without a computer-generated recommendation. An underwriter may be an employee of an insurance company otherwise affiliated with or in a third party arrangement with the insurance company.

In addition to identifying or verifying one or more likely industrial classifications for the entity, in an embodiment, the system 100 may output scores or rankings for the identified industrial classifications indicating how well they describe the entity. In embodiments, the output may alternatively or additionally include questions or data fields whose responses may be used for better identifying the industrial classification or providing more accurate risk analysis of the entity. In embodiments, the output may be provided to be displayed directly to a representative of the entity, to an insurance agent, or to another employee or contractor of the insurance company. The output may in embodiments alternatively or additionally be sent to a computer system of the insurance company or a third party providing processing on behalf of the insurance company; such a system may be an underwriting or an insurance processing computer system.

In the embodiment illustrated in FIG. 1, the system 100 includes one or more insurance agent terminals 102 in communication with an insurance company system 104 over a communication network 150. Insurance agents typically collect information and work on behalf of an insurance company to sell insurance to an entity. Insurance agents may be employed by the insurance company, or they may be third-party individuals or employed by a third-party company and contracted by the insurance company to market insurance products. Insurance agents who are not directly employed by the insurance company but who market the insurance company's products are considered a part of the insurance company for the purposes of this application. Each insurance agent terminal 102, which may in an embodiment be part of an insurance agent company system, interacts with the insurance company system 104. The agent terminal 102 in embodiments stores and executes software via which an insurance agent may obtain information from, and sell insurance policies to, customers of the insurance agent. In one implementation, such software includes a web browser configured for receiving and displaying web page data from the insurance company system 104. In embodiments, the agent terminal software includes a thin or thick client that communicates with the insurance company system 104. In general, an agent terminal 102 can be any computing device known in the art, including for example, a personal computer, a laptop computer, netbook, smart phone, hand-held computer, or a personal digital assistant. In embodiments, at least a portion of the functionality of one or more agent terminals 102 is carried out by a computing device operated by the insurance company. In embodiments, the insurance company may offer a web site for direct customer interaction, for example to purchase a new insurance policy, update an insurance policy, receive a new insurance policy quote, or request renewal of an insurance policy.

In the embodiment illustrated in FIG. 1, the insurance company system 104 includes a plurality of application servers 112, a plurality of load balancing proxy servers 114, an insurance company database 116, a claims database 118, a processing unit 120, and company terminal 122. These computing devices are connected by a local area network 126.

The application servers 112 are responsible for interacting with the agent terminals 102. For example, the application servers 112 store and execute software for generating web pages for communication to the agent terminals 102. These web pages serve as user interfaces for insurance agents to interact with the insurance company system 104. In embodiments, alternatively, or in addition, one or more of the application servers 112 may be configured to communicate with thin or thick clients operating on the agent terminals 102. The load balancing proxy servers 114 operate to distribute the load among application servers 112.

The insurance company database 116 stores information about insurance policies sold by the insurance agents. For each insurance policy, the database 116 includes for example and without limitation, the following data fields: policy coverage, limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer payment history, or derivations thereof. Additionally, an insurance claims database 118 includes information related to claims of insurance policies, such as descriptions of events causing insurance claims to be made, information about the entities involved, police reports, and witness statements. A single database may be used for storing data from both the insurance company database 116 and the insurance claims database 118. A logical database may be stored in one or more physical data storage devices which may be co-located or located at different facilities.

The processing unit 120 is configured for determining or verifying one or more likely industrial classifications of an entity. The processing unit 120 may comprise multiple separate processors, such as a content processor, which retrieves content from client-related electronic resources such as websites and social media resources, over the communications network 150, current policy content from the insurance company database 116, and/or insurance claims content from the claims database 118. The processing unit 120 also includes a computerized predictive model processor which receives input from the content processor to determine or verify one or more likely industrial classifications for an entity. In an embodiment, the processing system 120 further includes a business logic processor, which, among other things, is configured to determine one or more insurance determinations, including determining a risk associated with an industrial classification and setting characteristics of an insurance policy based on that risk and/or the classification. The business logic processor may be configured to price an insurance policy and generate a quote. In an alternative embodiment, insurance quotes may be generated by a separate processor called a quote generation processor. An exemplary implementation of a computing device for use in the processing system 120 is discussed in greater detail in relation to FIG. 2.

The company terminals 122 provide various user interfaces to insurance company employees to interact with the processing system 120. The interfaces include, without limitation, interfaces to adjust, further train, or retrain the computerized predictive model; to retrieve data related to the computerized predictive model; to manually adjust identified industrial classifications; and to adjust insurance risks of industrial classifications. In some embodiments, different users may be given different access privileges. For example, marketing employees may only be able to retrieve information on entities and industrial classifications but not make any changes to databases or predictive models. Such interfaces may be integrated into one or more websites for managing the insurance company system 104 presented by the application servers 112, or they may be integrated into thin or thick software clients or stand alone software. The company terminals 122 can be any computing devices suitable for carrying out the processes described above, including personal computers, laptop computers, personal digital computers, smart phones, servers, and other computing devices.

The third party data sources 106 provide data not generally available in the insurance company system 104. Third party data can be obtained freely or by purchasing the data from third-party sources. The third party data may be used for training the computerized predictive model or categorizing a particular entity seeking insurance. The third party data sources include web pages published publicly on the Internet or secure websites that require login access. The third party data sources may include data from advertising sources, such as yellowpages.com, services providing ratings, such as Angie's List and Yelp, and other sources. The content processor in processing system 120 can retrieve content from electronic resources accessible via networks including the Internet from, for example, the website of entities seeking insurance, social media pages and fees of such entities, or electronic resources of entities that publish reviews of the entity seeking insurance. Third party data sources may also include industrial classifications from credit information vendors, such as Experian or Dun & Bradstreet, or other third-party entities that provide industrial classifications. These or similar companies may also provide company or organization profile information for categorizing an entity or training the predictive model.

In an embodiment, the system 100 includes an underwriter. The insurance company may include an underwriting service, which is part of or in communication with the insurance company system 104. In some cases, the insurance company may contract with one or more third party underwriters 130, which are separate from the insurance company system 104. The underwriter evaluates the risks and exposures of the entity seeking insurance. The underwriter may also set the price of an insurance premium. In the case that underwriting analysis is performed outside of the insurance company system 104, the underwriter system may include one or more of the processing elements of processing unit 120. In embodiments, the underwriter system may include the content processor for retrieving and processing data related to an entity for classifying the entity, and the computerized predictive model for determining an industrial classification related to the entity. Alternatively, the insurance company system 104 may include these processing elements and send the results over the communication network 150 to the underwriter, which will use the industrial classification information to set the premium price.

Rather than shopping through an insurance agent, a customer may interact directly with the insurance company system 104 through customer terminal 132 over communications network 150. A representative of the entity directly enters data related to the entity for use in pricing an insurance policy for the entity. The representative also receives output from the insurance company via the customer terminal 132. The customer terminal 132 in embodiments stores and executes software via which a customer may obtain information on and purchase insurance policies. In embodiments, such software includes a web browser configured for receiving web page data from the insurance company system 104. In alternative embodiments, the software includes a thin or thick client that communicates with the insurance company system 104. The customer terminal 132 may be any computing device known in the art, including for example, a personal computer, a laptop computer, netbook, smart phone, hand-held computer, or a personal digital assistant.

Figure 2:
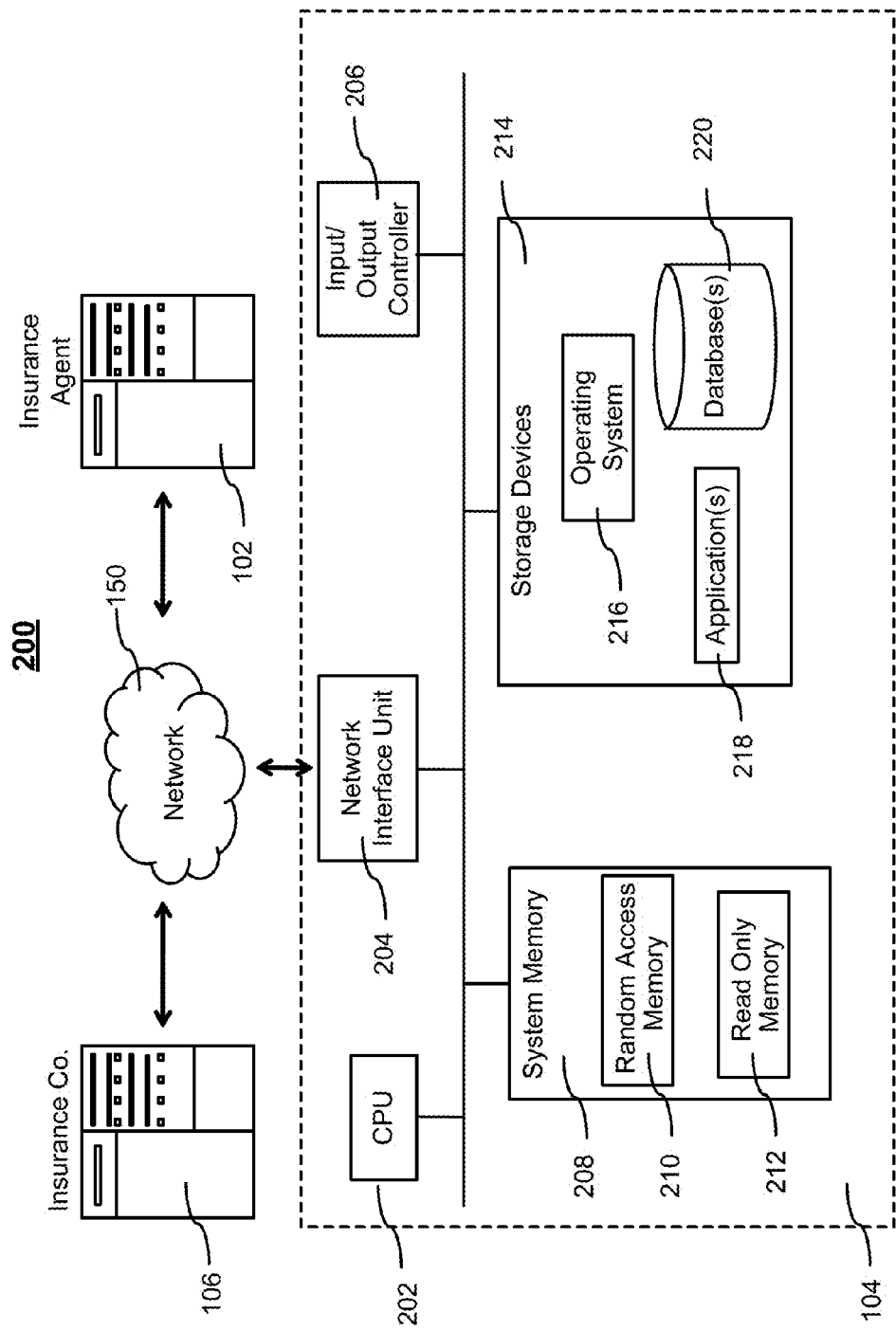
FIG. 2 is a block diagram of a computing system as used in FIG. 1, according to an illustrative embodiment of the invention.

FIG. 2 is a block diagram of a computing device 200 used for carrying out at least one of content processing, predictive model processing, and business logic processing described in relation to FIG. 1, according to an illustrative embodiment of the invention. The computing device comprises at least one network interface unit 204, an input/output controller 206, system memory 208, and one or more data storage devices 214. The system memory 208 includes at least one random access memory (RAM) 210 and at least one read-only memory (ROM) 212. All of these elements are in communication with a central processing unit (CPU) 202 to facilitate the operation of the computing device 200. The computing device 200 may be configured in many different ways. For example, the computing device 200 may be a standalone computer or alternatively, the functions of computing device 200 may be distributed across multiple computer systems and architectures. The computing device 200 may be configured to perform some or all of the content processing, predictive model processing, and business logic processing, or these functions may be distributed across multiple computer systems and architectures. In the embodiment shown in FIG. 1, the computing device 200 is linked, via network 150 or local network 124 (also described in FIG. 1), to other servers or systems housed by the insurance company system 104, such as the load balancing server 114, and the application servers 112.

The computing device 200 may be configured in a distributed architecture, wherein databases and processors are housed in separate units or locations. The computing device 200 may also be implemented as a server located either on site near the insurance company system 104, or it may be accessed remotely by the insurance company system 104. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured as a content processor. The content processor retrieves external data from, for example, the Internet and claims database 118. The content processor accesses the Internet, claims database 118, or other data source and extracts data for predictive model processing. The content processor may extract and manipulate data from text, images, or other formats delivered through HTML, SVG, Java applets, Adobe FLASH, Adobe SHOCKWAVE, Microsoft SILVERLIGHT, or other web formats or applications. The same computing device 200 or another similar computing device may be configured as a predictive model processor. The predictive model processor receives input from the content processor to determine one or more likely industrial classifications for an entity.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. In some embodiments, the database(s) 220 includes a database storing insurance company data and/or claims data used for training the predictive model or identifying the industrial classifications of entities. The database(s) 220 may include all or a subset of data stored in insurance company database 116 and/or claims database 118, described above with respect to FIG. 1, as well as additional data, such as formulas or manual adjustments, used in establishing the insurance risk of an entity and other insurance determinations.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing determinations of likely industrial classifications as described in relation to the following Figures. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
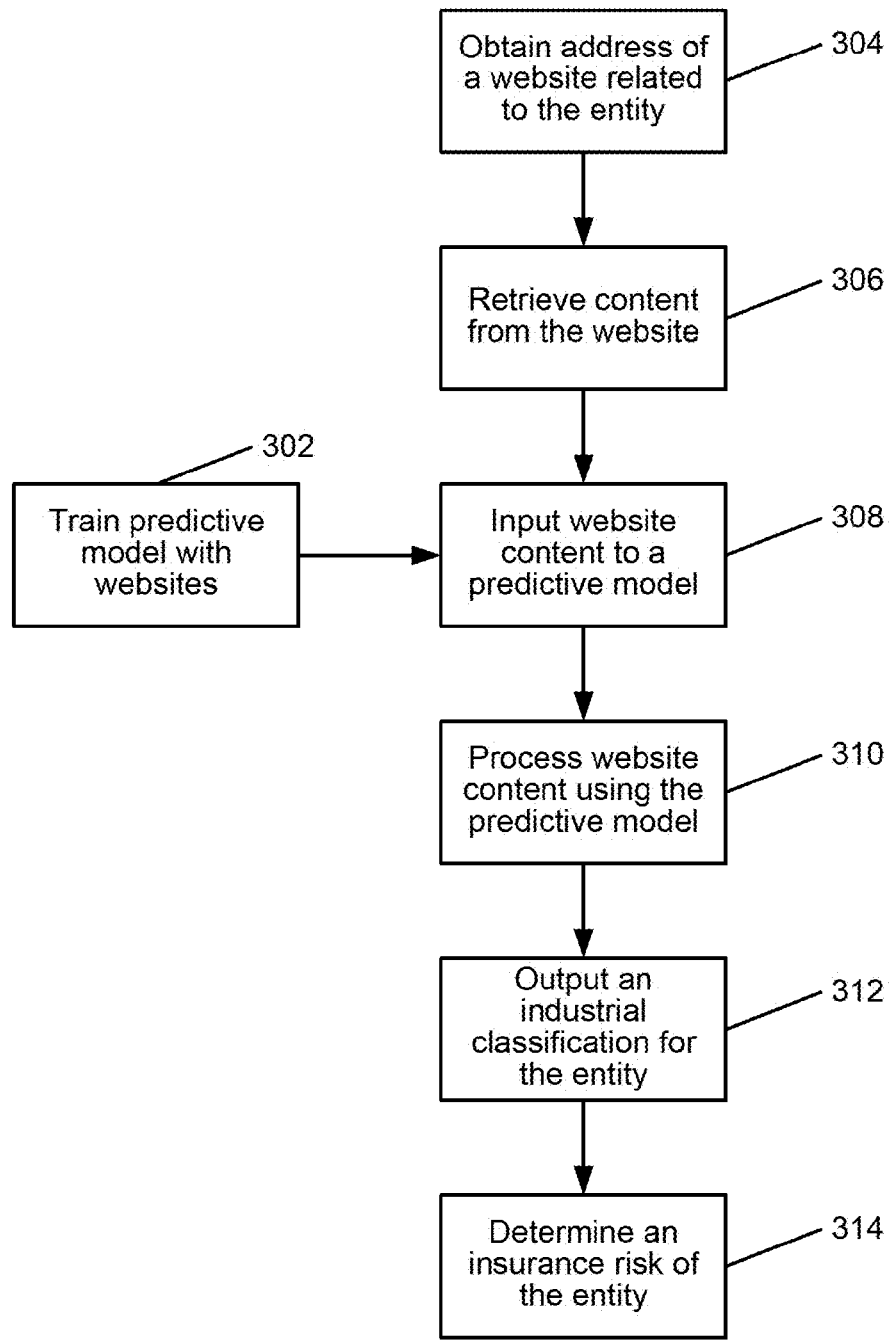
FIG. 3 is a flowchart for a method of determining the industrial classification and insurance risk of an entity, according to an illustrative embodiment of the invention.

FIG. 3 is a flowchart for a method 300 of determining the industrial classification and insurance risk of an entity, according to an illustrative embodiment of the invention. The method 300 comprises training a predictive model with websites (step 302), obtaining a web address related to an entity (step 304), retrieving content from the website (step 306), accepting processed web content (step 308), further processing the website content using a predictive model (step 310), outputting an industrial classification for the entity (step 312), and determining an insurance risk of the entity (step 314).

Before using the computerized predictive model, it must be trained on a set of training data (step 302). Training data includes content retrieved from websites, such as company websites; ratings websites such as ConsumerSearch, Eopinions, and Yelp; and social networking sites, such as Facebook, Twitter or LinkedIn. Any website that includes information about an entity with a known industrial classification and/or employees of that entity may be used as training data. Any combination of techniques for web scraping, such as text grepping, HTTP programming, DOM parsing, HTML parsing, or use of web scraping software, may be used to retrieve web content. The content may comprise text, images, videos, animation, or any other website content. The content may be published on the website using HTML, SVG, Java applets, Adobe Flash, Adobe Shockwave, Microsoft Silverlight, or other web formats or applications. The content processor is configured for retrieving the website content in some or all of the aforementioned formats or any other format.

In order to train the computerized predictive model, the extracted electronic resource data is processed in order to identify indicators of a particular industrial class. For text data, natural language processing techniques may be used to organize the text. The content processor may filter stop words, such as articles or prepositions, from the text. In one embodiment, the content processor may only retain words of a certain part of speech, such as nouns and/or verbs. The remaining words may be reduced to their stem, base, or root form using any stemming algorithm. Additional processing of the website content may include correcting spelling errors, identifying synonyms of words, performing coreference resolution, and performing relationship extraction. Once the words have been processed, they may be counted and assigned word frequencies or ratios.

In addition to website content, each entity is assigned at least one industrial classification, typically from a standardized industrial classification system such as the Standard Industrial Classification (SIC) system or North American Industrial Classification System (NAICS). The industrial classifications may be provided by a third party, such as a vendor like Experian or Dun and Bradstreet, and/or assigned by the insurance company. If the industrial classifications are provided by a third party, the insurance company may review the assigned classifications and confirm or adjust them. More than one industrial classification may be assigned to an entity. For example, a bakery may fall under at least SIC codes 2050 (Bakery Products) and 2052 (Cookies and Crackers) if the bakery makes cookies as well as cakes and pies.

The computerized predictive model is trained to classify an entity's website content as indicative of one or more industrial classifications, for example, using the word count or word frequency data described above. Because of the large amount of data and large amount of potential industrial classifications, Bayesian classifiers, particularly Naïve Bayes classifiers and hierarchical Bayesian models, are very suitable. One Bayesian model that is particularly suitable is the Latent Dirichlet allocation model, which is a topic model that allows sets of observations to be explained by unobserved groups that explain why some parts of the data are similar. The text of a website or group of websites is viewed as a mixture of various topics, and learning the topics, their word probabilities, topics associated with each word, and topic mixtures of documents is a problem of Bayesian inference. The Latent Dirichlet allocation model is described in detail in the paper "Latent Dirichlet allocation" by David M. Blei, Andrew Y. Ng, and Michael I. Jordan (*Journal of Machine Learning Research* 3: pp. 993-1022, January 2003), incorporated herein by reference. Suitable statistical classification methods also include random forests, random naïve Bayes, Averaged One-Dependence Estimators (AODE), Monte Carlo methods, concept mining methods, latent semantic indexing, k-nearest neighbor algorithms, or any other suitable multiclass classifier. The selection of the classifier can depend on the size of the training data set, the desired amount of computation, and the desired level accuracy.

For classifying an entity using a trained predictive model, the industrial classification system first obtains a web address related to the entity (step 304). The web address may be input through an application on the agent terminal 102 or customer terminal 132 from FIG. 1. The web address may be received from a third party data source, such as a vendor that collects and distributes information on entities. Alternatively, the web address may be retrieved from the insurance company database 116, which may store the web addresses of insured entities' websites. The system may include or be in connection with another database or data store to supply a web address. For example, a system memory may store web addresses of popular ratings or review websites, such as ConsumerSearch, Eopinions, Yelp, etc., which can be searched to obtain a web address of a web page with published reviews and other information related to the entity. Similarly, the processing unit 120 may automatically search the Internet using, for example, Google, Bing, Yahoo!, etc. and inputting the entity's name, possibly along with other information, such as location. Such a search can return addresses of the entity's website and/or addresses of other websites related to the entity. In another embodiment, the processing unit 120 may search social networking sites, such as Facebook or LinkedIn, that include information about the entity and/or employees of the entity. Employee information of interest for identifying an industrial classification includes education, past positions, and current job title. In embodiments, the obtained data may include data from any accessible electronic resources under the control of the customer. In social networking sites or social networking services, the resources searched may include pages or other portions of resources maintained by or on behalf of a customer on social networking services such as the FACEBOOK®, MYSPACE® and TWITTER® social networking services, as well as communications, such as status updates and tweets, generated on behalf of the entity to subscribers or followers. In embodiments, data generated by third parties not under the control of the entity, such as wall posts and retweets, but associated with the entity in a social networking site, may also be obtained. Data not generated by or on behalf of the entity may be tagged or identified as such to provide for differential processing in the model, such as by providing a lower weight to such data.

Next, the content processor retrieves content from the website (step 306). The content may comprise text, images, videos, animation, or any other website content. The content may be published on the website using HTML, SVG, Java applets, Adobe Flash, Adobe Shockwave, Microsoft Silverlight, or other web formats or applications. The content processor is configured for retrieving the website content in some or all of the aforementioned formats or any other format. The content processor is further configured to convert the content to a format suitable for the computerized predictive model as necessary, according to, for example, the methods described above. In some embodiments, the content from multiple websites (e.g. a company website and one or more ratings websites) is obtained, or multiple pages on or linked from a company's website are obtained. Once the website content has been gathered and processed as necessary, it is then sent to the computerized predictive model processor (step 308). In one embodiment, the content processing element and computerized predictive model are located on the same physical processor. The content processor may flag certain words, such as "nuclear", "explosives", "obstetrician", or "midwife", that indicate that an entity might be particular risky and should be subject to further review.

Upon receiving the website content, the computerized predictive model processes the content according to the classification method being used to determine at least one industrial classification for the entity (step 310). The industrial classification may be a standardized classification code, such as a NAICS, SIC, or ICB code. Depending on available data and desired resolution, the computerized predictive model may return industry, supersector, sector, or subsector classifications. The computerized predictive model may first select one or more industries, then select one or more supersectors within the selected industries, and so forth, collecting additional data to achieve more specific classifications. The computerized predictive model may also calculate a value, such as a confidence level or likelihood, indicating how well a particular industrial classification describes the entity. The computerized predictive model may also return an estimation error.

The one or more industrial classes identified by the computerized predictive model are then output to a business logic processor. From the output of the computerized predictive model, the business logic processor determines an insurance risk of the entity (step 314). The business logic processor may look up an insurance risk of a particular entity in a table. The insurance risk may be further based on additional information related to the entity, for example and without limitation, the company size, a geographic region in which the company operates, materials used or stored by the company, or the business cycle of the entity.

If the model outputs more than one classification for an entity, the business logic processor can calculate an aggregate risk rating. The insurance risks associated with the industrial classifications may be weighted by the confidence level or likelihood of each industrial classification and summed. Alternatively, the insurance risks may be weighted according to the rankings of the confidence level. There may be a set lower threshold of confidence of likelihood below which industrial classifications are not considered. In other implementations, the insurance risk is simply the insurance risk of the entity that has the highest insurance risk, or alternatively the insurance risk of the most likely industrial classification. The insurance risk may depend on the type of coverage sought. In this case, each industrial classification may have different insurance risks for different types of coverage.

In some embodiments, the business logic processor is located on an underwriter's computer system 130, which receives the output of the computerized predictive model processor over the network 150. In other embodiments one or both of the computerized predictive model processor and the content processor are located on the underwriter's computer system 130 as well.

In addition, in certain embodiments, the insurance company can either augment the predictive model using other available data related to entities or build additional stand-alone predictive models from additional data. For example, data obtained from web scraping can be augmented with claims data by applying similar data scraping techniques to the claims database 118, discussed above in relation to FIG. 1. The claims database 118, which includes descriptions of events causing insurance claims to be made, information about the entities involved, police reports, and/or witness statements, includes information that is highly relevant to losses entities may incur. Therefore, words identified in the claims database may be assigned heavier weights in the model as they may be more indicative of the types of claims that would be received from an entity. In another example, upon receiving a claim from an entity, the insurance company may reevaluate the industrial classification of the entity to determine if it needs to be changed in the future. In this case, the insurance company system determines the industrial classification by processing the claim data with a standalone predictive model trained on the claims database 118 or a predictive model trained on both claim and web data.

In addition to industrial classification, the computerized predictive model or a second computerized predictive model may be used to determine additional information about the entity. For example, the website content may be analyzed by the same or another similarly trained computerized predictive model to determine, for example, the company size, a geographic region in which the company operates, materials used or stored by the company, the business cycle of the entity, and/or any other data relevant to analyzing insurance risk.

Figure 4:
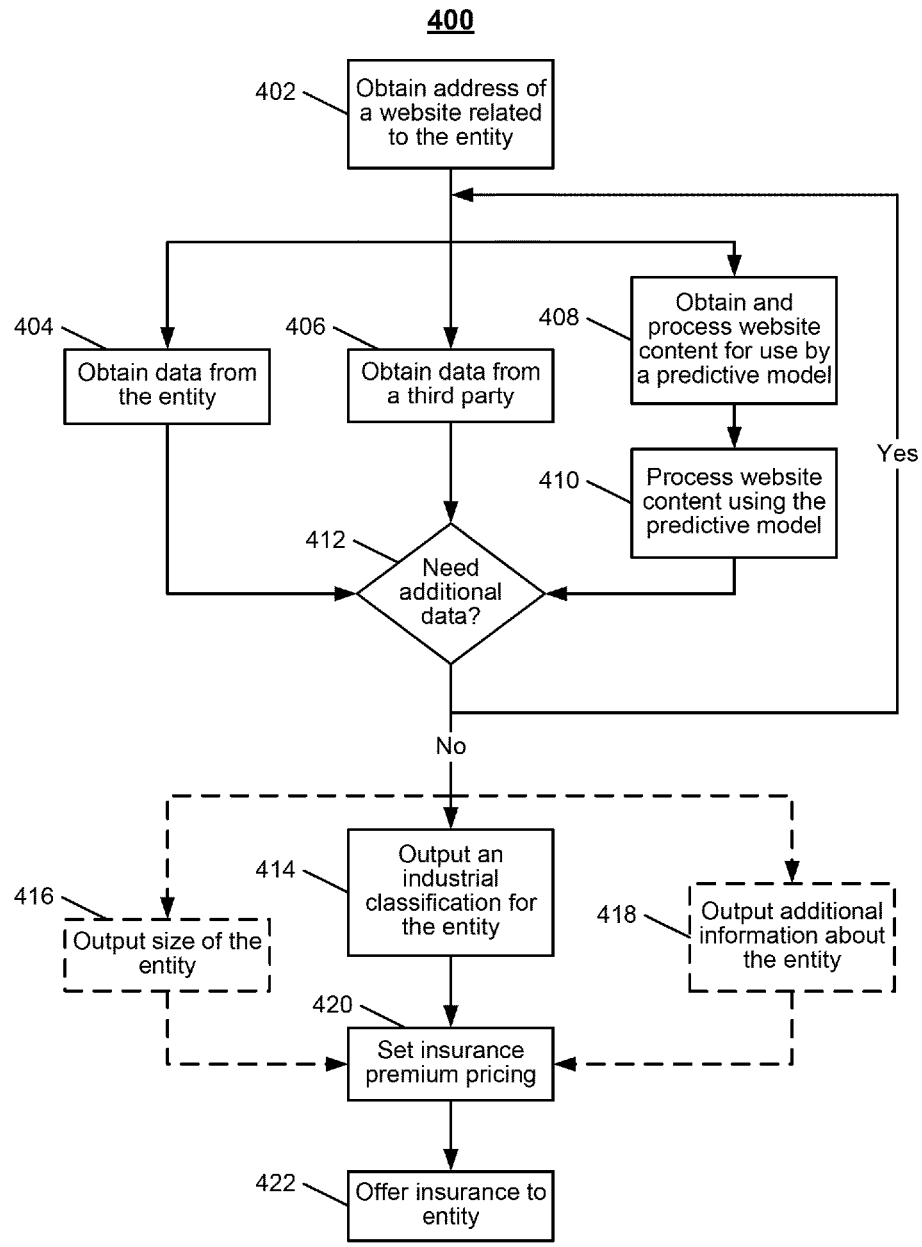
FIG. 4 is a flowchart of a method for determining and using the industrial classification and insurance risk of an entity within an insurance underwriting process, according to an illustrative embodiment of the invention.

FIG. 4 is a flowchart of a method 400 for determining and sing the industrial classification and insurance risk of an entity in an insurance underwriting process, according to an illustrative embodiment of the invention. The method 400 is used in an agent-assisted and/or computer application-assisted system for gathering information on an entity and determining an insurance premium price for the entity. The method begins with obtaining the address of a website related to an entity (step 402). Once the website address is obtained, the method includes a loop for obtaining data related to the entity from the entity (step 404), a third party (step 406), and websites (steps 408 and 410). Once it has been determined that no more additional data is needed (decision 412), computerized predictive models and/or other processing elements output information related to the entity (steps 414, 416, and 418), and an insurance price is set (step 420). Finally, the insurance at the determined premium price is offered to the entity (step 422).

First, the website related to the entity is obtained (step 402), similarly to obtaining the web address in step 302 from FIG. 3. Preferably, a representative of the entity or agent inputs a URL related to the entity. If the entity does not have a website or the representative does not volunteer a website, the web searching techniques discussed with respect to step 302 of FIG. 3 may be used to find a website published by the entity or containing information related to the entity. If the representative or agent does provide a website, the searching techniques may still be used to confirm the website provided and/or find additional websites with information related to the entity.

Once the website is obtained (step 402) three actions are performed in parallel. The agent or computer application obtains additional data from the entity (step 404). At the same time, a processor seeks additional data from a third party (step 406), and the content processor and computerized predictive model scrape website data and determine at least an initial industrial classification for the entity (steps 408 and 410). The agent or computer program may obtain basic information related to the entity, such as its name and contact information, before obtaining the entity's web address. However, it is useful to obtain the web address early in the process, so that while the agent or computer application are collecting information from the representative, the system can determine the entity's insurance risk, determine if additional information should be collected, and even determine what questions to direct to the entity based on the industrial classification and third party data. This streamlines the insurance application process by dynamically adjusting the line of questioning as new information is gathered from the entity and outside sources and reducing the number of questions that the representative of the entity needs to answer.

The data is obtained from the entity (step 404) in a computer-readable format. For example, representative of the entity or the insurance agent may enter text, select radio buttons, select a position on a number line, choose a response from a drop-down menu, or use any other form of graphical user input in a response to questions or requests from a computer application. The representative or agent may answer questions over a telephone or into a microphone and his voice processed with voice recognition software. Any other known form of user input may be used. An exemplary application for data collection is discussed below in relation to FIGS. 5 and 6.

A processor, such as CPU 202, seeks third party data for use in categorizing and assessing the entity (step 406). In some cases, website content may be processed directly without the use of a computerized predictive model. Third party data includes data from the websites discussed with respect to FIG. 3. Third party data may also be retrieved from an information vendor, such as those discussed above in relation to FIG. 1, which return an industrial classification or other data related to the entity. The method for obtaining and processing data from at least one website (step 408) and processing it with a computerized predictive model (step 410) are similar to steps 306, 308, and 312 discussed above in relation to FIG. 3.

Once data has been collected from the entity, data has been collected from any third parties, and/or data has been obtained and processed using a predictive model, the results are analyzed to determine if additional data should be collected (step 412). Several examples of scenarios in which additional data may be useful are described below.

In one example, the insurance system has established that the entity's industry is food production, the entity is located in Boston, and the entity employs 15 people. The industrial class and other entity information can be more specific, e.g. what kind of food is produced, which neighborhood is the entity located, and how many hours are worked by the employees. Therefore, the business logic processor determines what or how much additional data the computerized predictive model needs to determine a more specific industrial classification. In another example, the computerized predictive model has established that the entity's most likely industrial classification is bakery products, but only with 60% confidence. Because the confidence level is low, it is preferable to obtain more data to try to improve the confidence level. If it is determined that more data should be collected, the business logic processor determines whether other questions should be asked of the representative of the entity, and whether additional data should be requested from third parties.

In another example, a third party vendor returns the industrial classification for "General Contractor", but the computerized predictive model has returned the industrial classification "Painter." A disagreement between the two industrial classifications triggers a review process, wherein additional data may be sought from websites to be inputted into the computerized predictive model, additional questions may be generated and asked of the representative of the entity, and/or additional data may be sought from third parties. If the discrepancy cannot be resolved, the entity may be flagged for future review by an agent, an employee of the insurance company, or a human underwriter. Once the data of interest has been gathered, it is again analyzed to determine if additional data should be collected (step 412), and whether it is possible to obtain the desired information with additional data collection. If sufficient data has been received or the computerized predictive model returns a high enough confidence level in the classification, then it is determined that additional data is not needed, and the process proceeds to steps 416, 418, and 420.

Steps 416, 418, and 420 relate to outputting entity characteristics. The industrial classification is output to interested parties such as the agent, the representative, or an underwriter, and/or a business logic processor (step 414). In addition, the size of the entity, measured by, for example, annual income, number of employees, payroll, tax bracket, or another means (step 416) or any additional information about the entity, such as the location of the entity (step 418) may be output to the interested parties and/or the business logic processor. If not output directly to the business logic processor or another risk analysis module, the industrial classification and any other information may be stored until the representative or agent submits the insurance application, and they may be output to the agent, representative, or another knowledgeable party for confirmation.

The industrial classification and other application information, such as entity's name, contact information, size, location(s), type of insurance sought, and any industry-specific information is then sent to a business logic processor for setting the price of an insurance premium (step 420). The price and/or coverage are set based on risks associated with the industrial classification and any other characteristics of the entity. Once an offer of insurance is generated by the business logic processor, the offer is delivered to the entity via the agent or computer application (step 422). At this point, the representative of the entity can purchase the quote, save the quote for a later decision, request a revised quote, or turn down the quote.

The method 400 may be used not only to evaluate an entity applying for a new insurance policy, but also to reevaluate the industrial classification of a current policy holder. From time to time, particularly when an entity's policy is up for renewal, the insurance company may reevaluate the premium pricing using method 400. The insurance company may use an abbreviated but similar method since it may not be necessary to retrieve and/or confirm all of the information for an existing customer.

Figure 5:
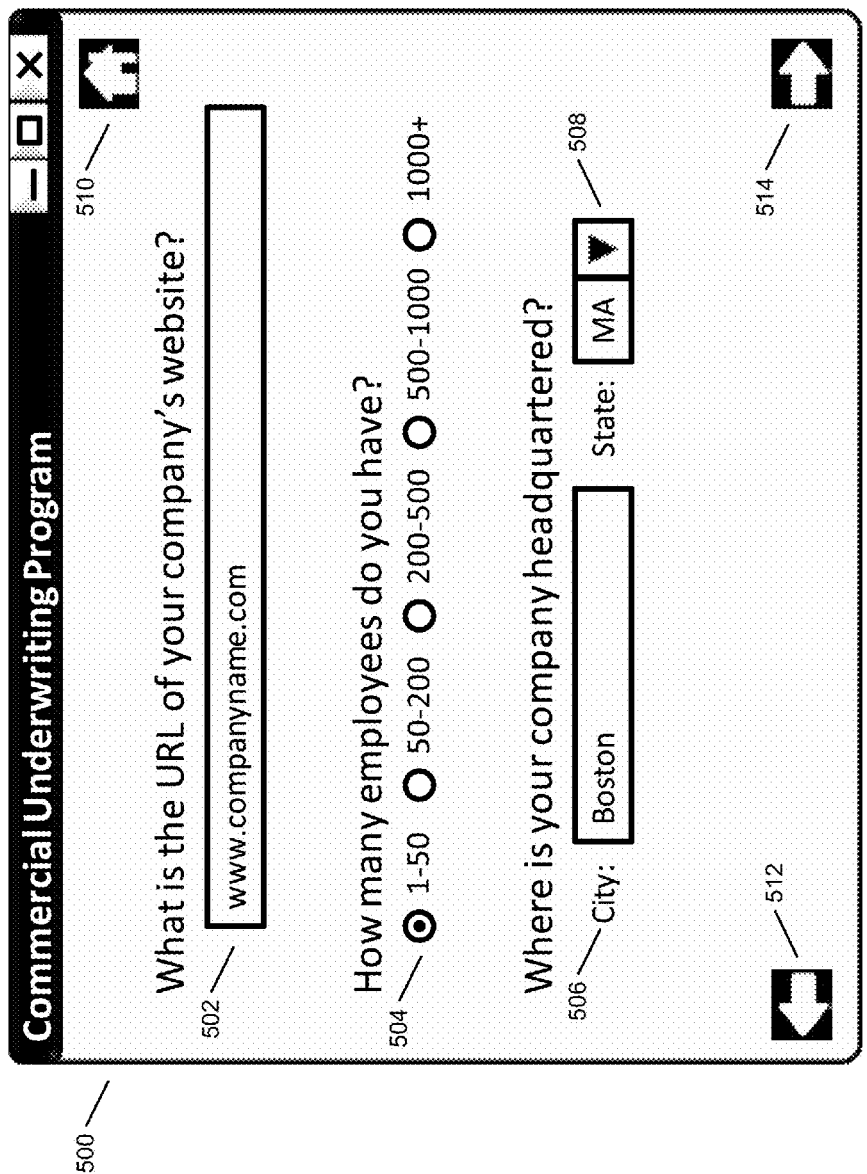
FIG. 5 is a diagram of a graphical user interface for obtaining data related to an entity for use in the insurance underwriting method of FIG. 4, according to an illustrative embodiment of the invention.

FIG. 5 is a diagram of a graphical user interface 500 of a computer application for obtaining data related to an entity for use in insurance underwriting, according to an illustrative embodiment of the invention. The graphical user interface 500 is configured so a representative of an entity can enter information about the entity, or so an agent can ask questions to the representative and fill in the answers. The first entry screen (not shown) of the computer application includes basic information on the entity, e.g. name, phone number, representative name, representative address, and representative email address. Graphical user interface 500, as shown, is a suitable second entry screen, still focused on general questions not specific to the industry. The web address is requested early, allowing the industrial classification and third-party data requests to run in the background while the user is answering questions.

The graphical user interface 500 includes a text box 502 in which the user enters the entity's website address. The graphical user interface 500 includes additional basic questions about the size and the location of the company. The size of the company is entered using radio buttons 504. If the user selects 1000+ employees, a later screen may ask the same question with larger answer choices. Alternatively, the number of employees may be answered by using a text box or by selecting a position along a number line. The city is typed into text box 506, and the state selected using drop-down menu 508. A Home button 510, a Back button 512, and a Next button 514 are used for navigation within the application. Home button 510 returns the user to a home screen, Back button 512 returns the user to a previous entry screen, and Next button 514 moves the user to the next entry screen. Hitting the Home button 510 may automatically save the responses so that the agent and/or representative may return to the application. Alternatively, the computer application may include a separate save function. The user is permitted to go back to previous entry screens to change answers, and the user can move ahead without answering all of the questions on an entry screen.

Figure 6:
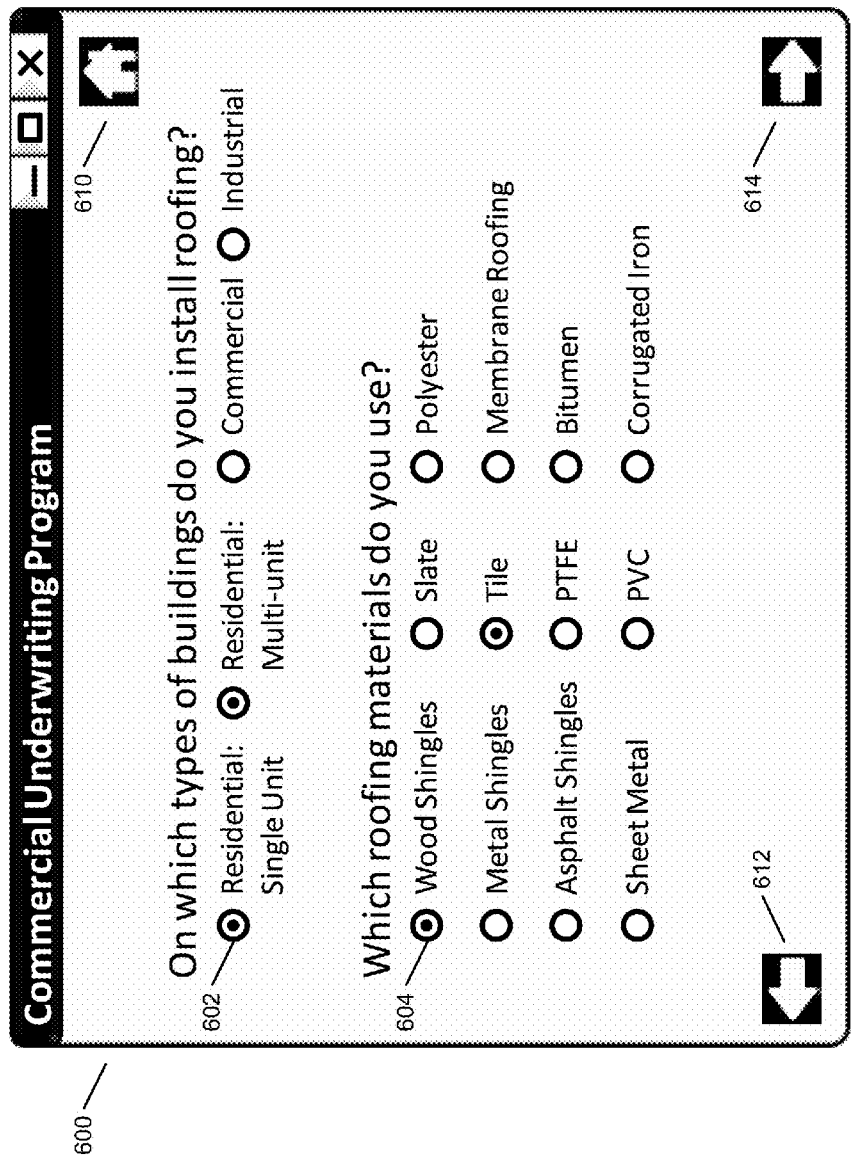
FIG. 6 is a diagram of a graphical user interface for obtaining additional data related to an entity for use in the insurance underwriting method of FIG. 4, according to an illustrative embodiment of the invention.

FIG. 6 is a diagram of a graphical user interface 600 for obtaining additional data related to an entity for use in insurance underwriting, according to an illustrative embodiment of the invention. FIG. 6 is a graphical user interface that may be displayed after the computerized predictive model has determined that the entity is in the roofing industry. The graphical user interface 600 asks questions specific to the roofing industry to determine what types of buildings the entity works on and which roofing materials are used in roofing projects. Different roofing projects and/or roofing materials may pose different levels of health or accident hazard and are associated with different industrial classifications. Thus, when pricing a policy including, for example, workers compensation insurance to a roofing contractor, the precise type of roofing being done by the roofers is important in establishing risk.

Both questions in FIG. 6 are answered using radio buttons 602 and 604. The navigation buttons 610, 612, and 614 are the same as navigation buttons 510, 512, and 514 from FIG. 5.

FIG. 7 is a diagram of a graphical user interface 700 for displaying industrial classifications determined by a predictive model, according to an illustrative embodiment of the invention. The industrial classification descriptions 704, listed in order from most suitable to least suitable, are presented in a table with their Standard Industrial Classification (SIC) codes 702 and confidence levels 706. The industrial classification(s) chosen for display may be based on a maximum number of allowable results or based on which classifications have been assigned a confidence level greater than a minimum confidence level. Rather than using the SIC system, other industrial classification code systems, such as North American Industrial Classification System (NAICS) classifications, Global Industry Classification System (GICS) classifications, Industrial Classification Benchmark (ICB) classifications, Thomson Reuters Business Classifications (TRBC), Statistical Classification of Economic Activities (NACE), Australian and New Zealand Standard Industrial Classifications (ANZSIC), or International Standard Industrial Classifications (ISIC) may be used. The computerized predictive model may be trained on one industrial classification system and store one or more lookup tables to translate to different industrial classification systems. This allows for compatibility with newer industrial classification systems if developed.

The graphical user interface 700 may allow the user to select the industrial classification or multiple industrial classifications that they believe are the most suitable. The navigation buttons 710, 712, and 714 are the same as navigation buttons 510, 512, and 514 from FIG. 5.

Figure 8:
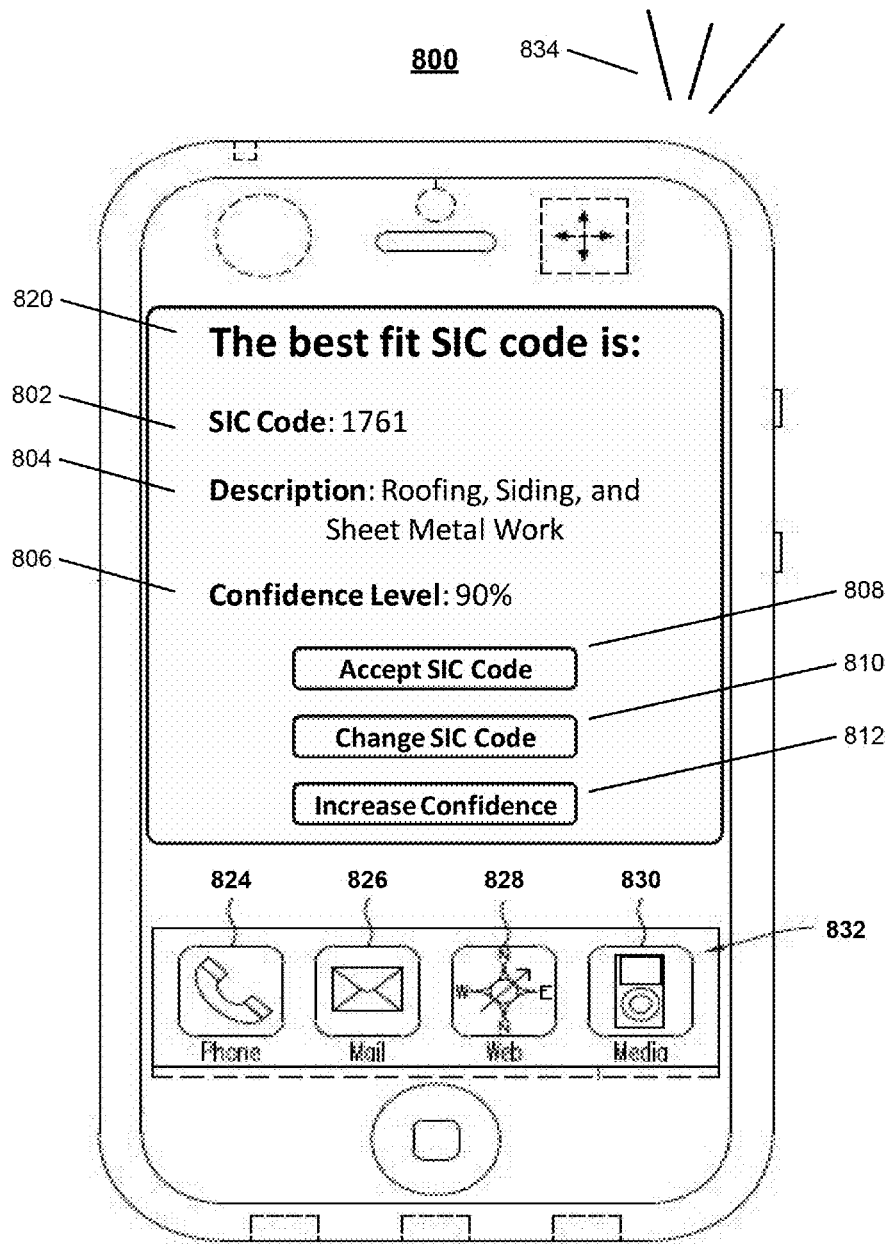
FIG. 8 is a diagram of a mobile device for executing an application for presenting an industrial classification of an entity, according to an illustrative embodiment of the invention.

FIG. 8 is a diagram of a mobile device 800 for executing an application for presenting an industrial classification of an entity, according to an illustrative embodiment of the invention. An insurance agent who travels may use an application on his mobile phone to fill out an application for an entity. For example, if an insurance agent needs to inspect facilities, assets, or behaviors of an entity for the insurance application, he uses the mobile device 800 to gather information about the entity while he is on-site. The mobile phone is in communication with the insurance company system 104 via antenna 834. The insurance company system 104 may perform any or all of the processing functions needed by methods 300 and 400 and return the results to the mobile device 800 for display.

As shown, the mobile device can launch one or more applications by selecting an icon associated with an application program. As depicted, the mobile device 800 has several primary application programs 832 including a phone application (launched by selecting icon 824), an email program (launched by selecting 826), a web browser application (launched by selecting icon 828), and a media player application (launched by selecting 830). Those skilled in the art will recognize that mobile device 800 may have a number of additional icons and applications, and that applications may be launched in other manners as well. In the embodiment shown, an application, such as insurance risk application, is launched by the user tapping or touching an icon displayed on the touch screen interface of the mobile device 800.

The graphical user interface 820 displayed on the mobile device 800 shows the output of the computerized predictive model. The graphical user interface 820 shows the selected SIC code, the description of the industrial classification, and the confidence level of the selected industrial classification. If the user agrees with the SIC code, then the user presses Accept SIC Code button 808. If the user does not think the SIC code is correct and wants to change it by, for example, choosing a different SIC code from a list of other selected industrial classifications with lower confidence levels, choosing a different SIC code from a list of all SIC codes, or manually entering a different SIC code, the user presses Change SIC Code button 810. If the user is unsure about the SIC code and wants to try to improve the confidence level, the user can press the Increase Confidence button 812, which will generate additional questions and/or perform additional analysis of third party data and website content to try to be more certain about the SIC code. In some implementations, the graphical user interface 820 can display multiple SIC codes, some or all of which may be suitable for the entity.

Figure 9:
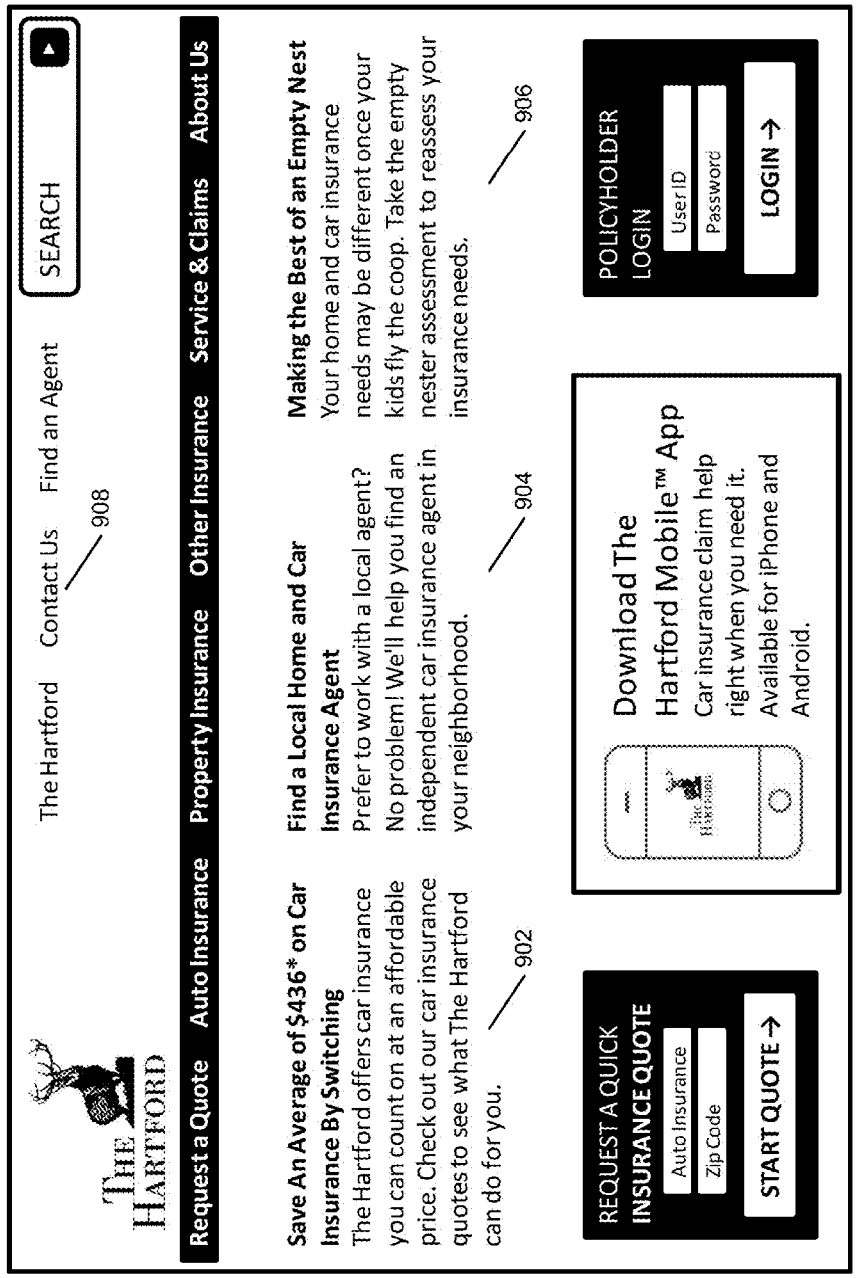
FIG. 9 is a simplified web page, illustrating a type of web page that would be analyzed for determining the industrial classification of an entity, according to an illustrative embodiment of the invention.

FIG. 9 is a simplified web page illustrating a type of web page that would be analyzed for determining the industrial classification of an entity, according to an illustrative embodiment of the invention. To classify The Hartford Financial Services Group, Inc., the industrial classification system may first navigate to the company's home page, a simplified version of which is shown in FIG. 9. The web page includes images, text, text input boxes, buttons, and links to other web pages. The content processor scrapes text from, for example, text segments 902, 904, and 906, which include text that is related to the entity. The content processor then processes the text, for example, counting seven instances of the root "insur-", six instances of the word "car", five instances of words related to "home" ("nest", "nester", "coop", and two instances of "home"), two instances of the word "agent", and two instances of the word "quote" in text boxes 902-906. The predictive model then processes the text information from the content processor to determine that industrial classifications for The Hartford include auto insurance services and property insurance services, possibly among other identified industrial classifications.

Figure 10:
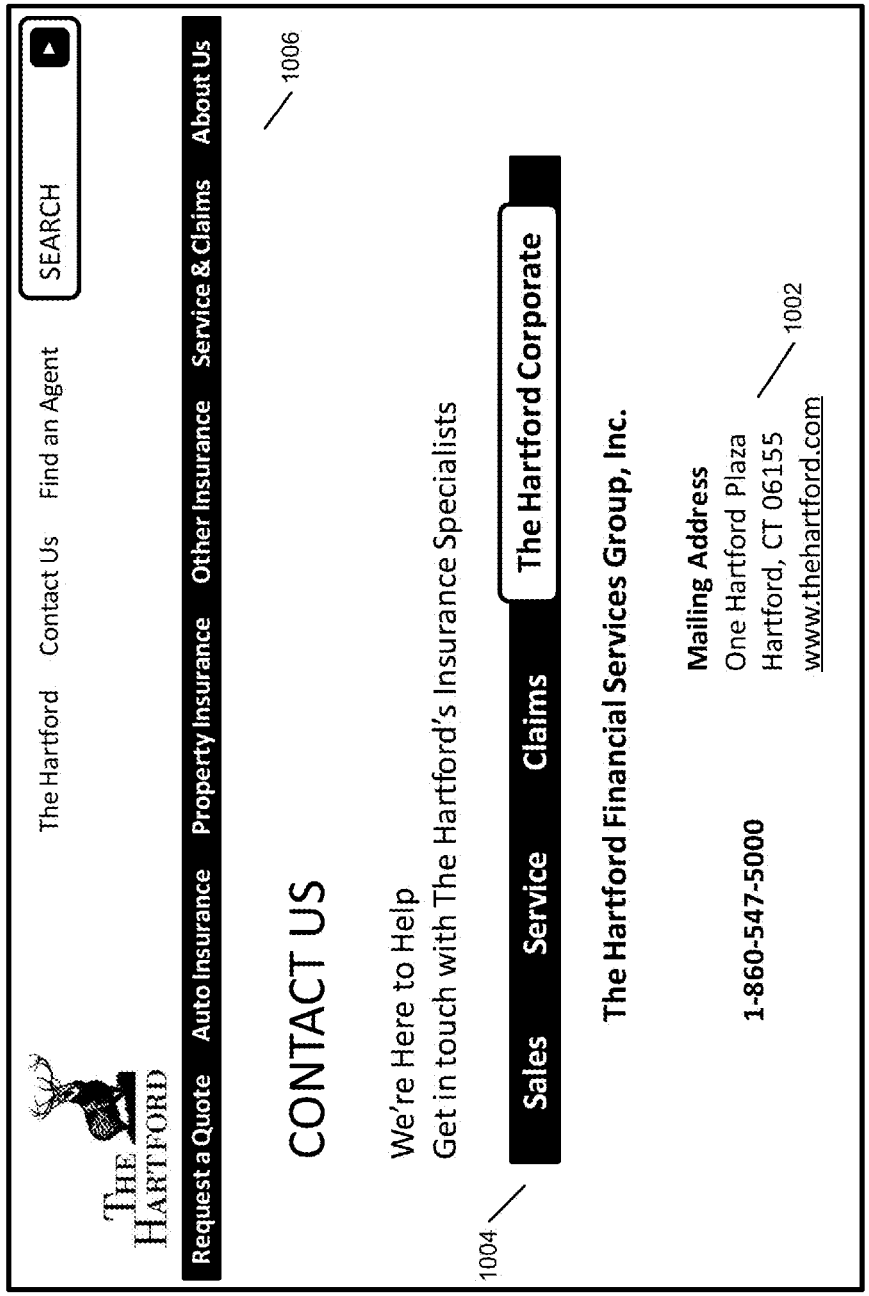
FIG. 10 is a simplified web page linked from the simplified web page of FIG. 9, illustrating another type of a web analyzed for determining the industrial classification of an entity, according to an illustrative embodiment of the invention.

The content processor may also be configured to follow the links from the homepage to find additional text and seek out additional information. As an example, the content processor may be configured to seek a location, such as an address of the corporate headquarters, of the entity. The content processor is configured to follow links with titles such as "Contact Us" or "Contact Information" to find an address for the entity. From the web page of FIG. 9, the content processor navigates to the "Contact Us" web page, a simplified version of which is shown in FIG. 10, using the "Contact Us" link 908 at the top of the web page of FIG. 9.

In the web page of FIG. 10, the content processor identifies that the lines of text below "Mailing Address" give the mailing address 1002 for the corporate headquarters of The Hartford Financial Services Group, Inc. The content processor may also scrape addresses for the Sales, Service, and Claims groups of The Hartford by navigating to these web pages using the tabs 1004. As described in relation to FIGS. 3 and 4, the content processor may continue to seek additional text or other information about the entity using the links in navigation bar 1006.

Figure 11:
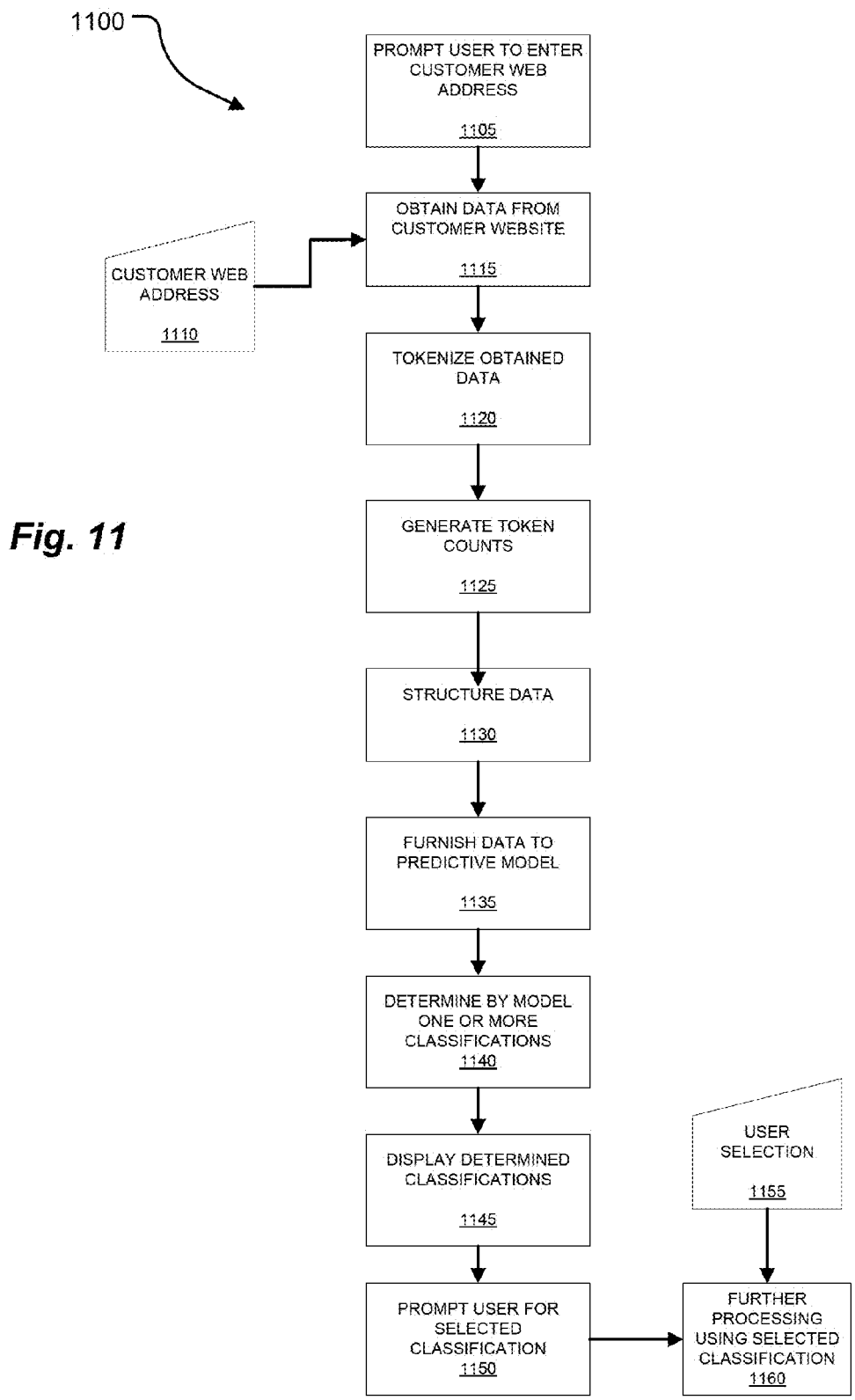
FIG. 11 is a process flow 1100 of an embodiment of a method of determining industrial classification of an entity.

Referring to FIG. 11, a process flow 1100 of an embodiment of a method of determining or verifying one or more likely industrial classifications of an entity is shown. A processor executing instructions in a software-implemented user front end prompts 1105 a user to input a website address of the customer. Responsive to receiving user input of the website address 1110, the processor causes data from the website corresponding to the web address to be obtained 1115. The obtained data may include data described in any embodiment, including data from a home page of the website and one or more additional levels, and may include only text, or text and additional data such as graphics data. The data may be tokenized 1120 employing suitable text extraction tools and techniques. The system may generate 1125 token counts from the tokenized website data. In embodiments, a listing of tokens, or words that are determined to have significance in determining industrial classification, may be employed. The obtained and processed website data, including token count data, may be structured as known in the text mining field 1130. The system may then furnish 1135 the structured data to the computerized predictive model for analysis. The model then determines 1140 one or more of the most likely industrial classifications for the customer. The computerized predictive model returns the one or more most likely industrial classifications, and may include a likelihood ranking on a numeric, verbal or graphic scale associated with each classification. The system causes the one or more industrial classifications to be displayed 1145 on the software-implemented user front end on a user-accessible device. In embodiments, the system may display two or more of the most likely industrial classifications and provide a prompt for a user to select a correct classification from the displayed classifications. The system may in an appropriate embodiment cause to display on a user interface on a user-accessible device a plurality of candidate classifications for the user, such as 2, 3, 4 or 5 candidates. The display may include likelihood ranking on a numeric, verbal, or graphic scale associated with the candidate classifications. The display may prompt 1150 the user to select one of the displayed candidate classifications via any available input scheme. The user-selected classification may be received 1155, and then provided 1160 to other systems, programs or processes, including without limitation business logic processes for determining insurance policy premiums, terms and conditions, by way of example, for further processing.

The system may be configured using software to display on a user device an option for a user to provide feedback based on the identified classifications. By way of example, the user may have an option to indicate that none of the identified candidate classifications are correct. Such a response may cause the system to store the comment for further processing for use in model development and analysis, prompt the system to commence a routine for interaction with the user to seek additional information, prompt a human user to contact the user, return the data to the model for further processing, or other actions.

Figure 12:
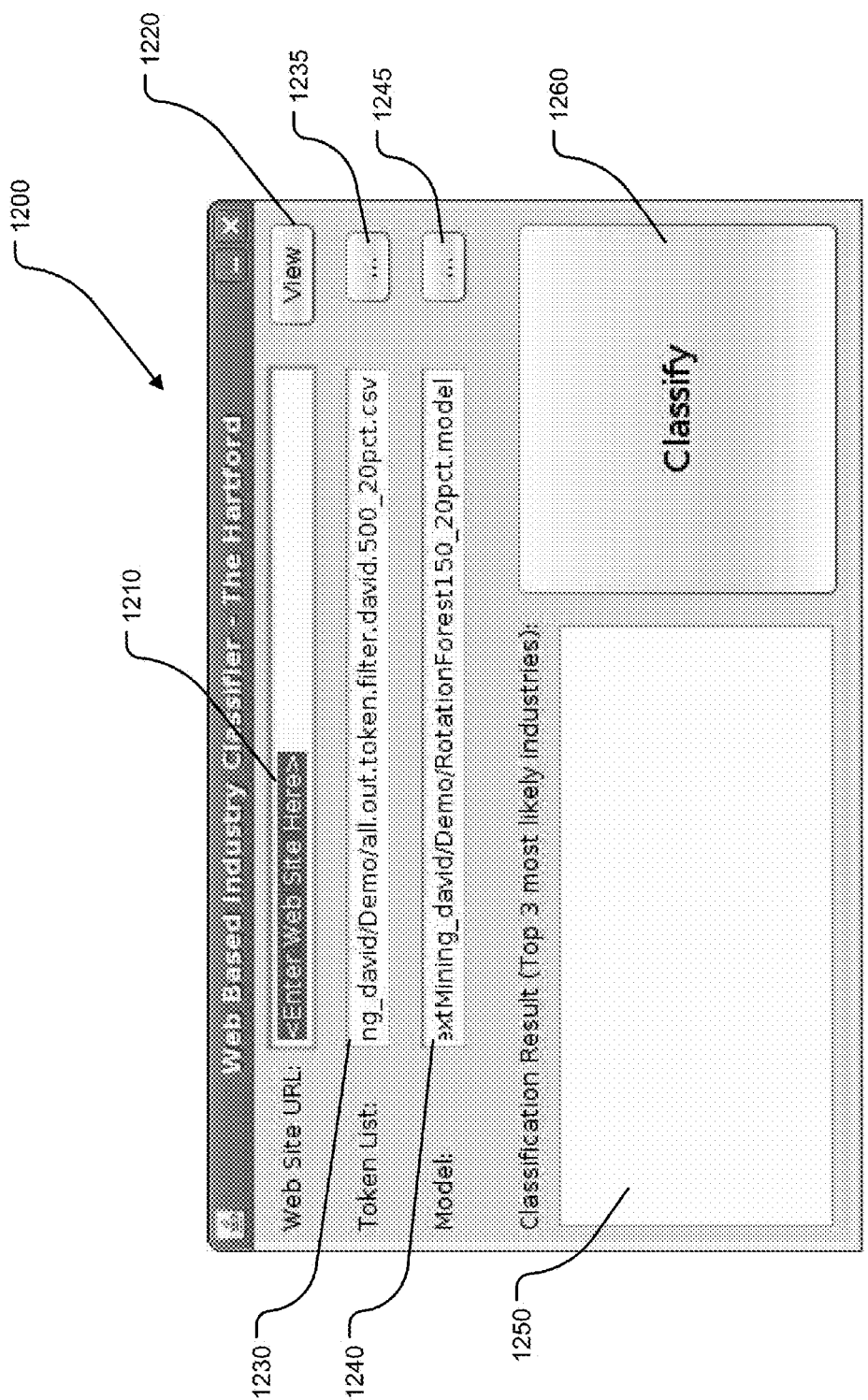
FIG. 12 shows a screen shot of a screen generated on a user device by a web-based industry classifier system.

Referring to FIG. 12, a screen shot of a screen generated on a user device by a web-based industry classifier system is shown. The web-based system may be accessible by insurance agents, entity representatives and insurance company personnel such as underwriters. In embodiments, the web-based system may only require that a user-accessible client device run a browser compatible with an insurance company or third party provider webserver, which webserver may communicate with a system hardware server (or multiple servers) for performing data processing operations such as obtaining entity electronic resource data, tokenizing, generating token counts, structuring data, and applying a predictive model to structured data. Screen 1200 provides an input prompting a user to provide a website address for an entity 1210. An open website button 1220 causes the system to open a window displaying the target website. The screen 1200 further displays a path 1230 or other identification of a document having a list of tokens. In embodiments, an input (here, button 1235) may permit a user to browse for selection of an alternate list of tokens. Screen 1200 further displays a path or other identification of a statistical model 1240. In the displayed embodiment, the Rotation Forest statistical model is employed. The Rotation Forest statistical model is described, for example, in Rotation Forest: A New Classifier Ensemble Method, IEEE Transactions on Pattern Analysis and Machine intelligence, October 2006 (vol. 28 no. 10), pp. 1619-1630, by Juan J. Rodriguez, Ludmila I. Kuncheva, and Carlos J. Alonso (hereinafter "Rodriguez, et al."). Button 1245 permits a user to browse for and select an alternative statistical model. In embodiments, one or more of the displays and options for token lists and statistical models may be omitted. The browser based system is configured to receive a listing of most likely classifications from a statistical model and return those in window 1250. The user may then select one of the returned classifications, such as by using a pointing device or cursor to highlight one of the listed most likely classifications and selecting classify button 1260, which causes the browser to return the user selection to the system. In embodiments, confidence levels may be provided associated with the classifications. In embodiments, a percentage score summing to 100% may be provided, or a percentage score summing to a lower figure, may be provided.

In embodiments, the system may be configured to classify entities in one of the following list of industries:
Food Processors
Retail
Metal Manufacturing
Real Estate
Educational Services
Business and Personal Services
Financial Services
Technology Manufacturing
Associations
Printing and Publishing
Construction
Professional and Medical Offices
Entertainment
Cultural Organizations
Technology In embodiments, the system may further classify entities into finer categories.

The classification results may be employed in business processes, executed, by way of example, by one or more business logic processors, including real-time underwriting and validation and fraud detection processes. It will be appreciated that such validation and fraud detection processes may be executed at any suitable time, including in connection with evaluation of claims.

An exemplary model may be built using approximately 20% of available data, such as 6500 websites out of over 30,000 available websites. More than one model may be implemented in a system, and a wide range of models may be implemented.

A best model based on testing has a perfect classification rate close to 70%.

Model building time increases as more data and more sophisticated models are used. LRO risk can affect model accuracy.

In demonstrations and testing, the following websites were tested and noted results achieved. In the small commercial category: A dental practice website was successfully classified in the industrial classification Professional and Medical Offices. A website of a service for recovery of lost data was successfully classified in the industrial classification Technology. A university was successfully classified in the industrial classification Education. A provider of dog training, grooming and boarding services was successfully classified in the industrial classification Business and Personal Service. A mortgage origination firm was successfully classified in the classification Financial Services. A provider of hazard and aviation obstruction lighting was classified in the classification Real Estate; this result may not be the best classification.

In the small commercial category, the system has provided classifications of Food Processors for a business that provides food products at the wholesale level, and Entertainment for a business providing audio products for use in enhancing cognitive performance; both of these results may not be the best classification.

In the large commercial category, embodiments of the system have successfully categorized a search services provider in the Technology industrial classification and an insurance company in the Financial industrial classification.

In embodiments, use of 20% of available data has achieved good results. Higher percentages of available data, such 50% or 100% of data may be employed.

In embodiments, greater numbers of keywords may be used, such as greater numbers of tokens. About 500 tokens has provided good results.

In embodiments, improved structured data before submission to the predictive model may be employed.

Computing time increases as data size and token size increase. For example, for an increase of data from 10% to 50% (5×) and an increase of keywords from 500 to 20,000 (40×), a roughly 200 times increase in complexity and possibly in computing time results.

In embodiments, more than one predictive model may be applied to entity data. The selection of the classification may be based on voting, weighting or other processes run on differing results provided by different predictive models on the same entity data. In embodiments, the predictive models may be applied iteratively to the entity data, or multiple iterations may be run using one or more predictive models, with processing between iterations including removing selected token data, restructuring the data, removing low probability industries or classifications from consideration, by way of example.

With more data, more tokens and more sophisticated models, and/or additional models, the accuracy will increase, but model building time may increase. Run time for real-time scoring will not be affected significantly once the one or more models are built.

In embodiments, error detection capabilities may be included in the system processing. By way of example, websites or other electronic resources with overall text content below a threshold, or providing token counts below a threshold, may be returned to the user as errors. The error detection processing may be implemented prior to tokenization, e.g., from comparing a character count to a threshold, after tokenization using a suitable threshold, using token counts, thus prior to submission to the one or more predictive models. The predictive models may also include error processing, such as providing a confidence value below a threshold as an error.

Figure 13:
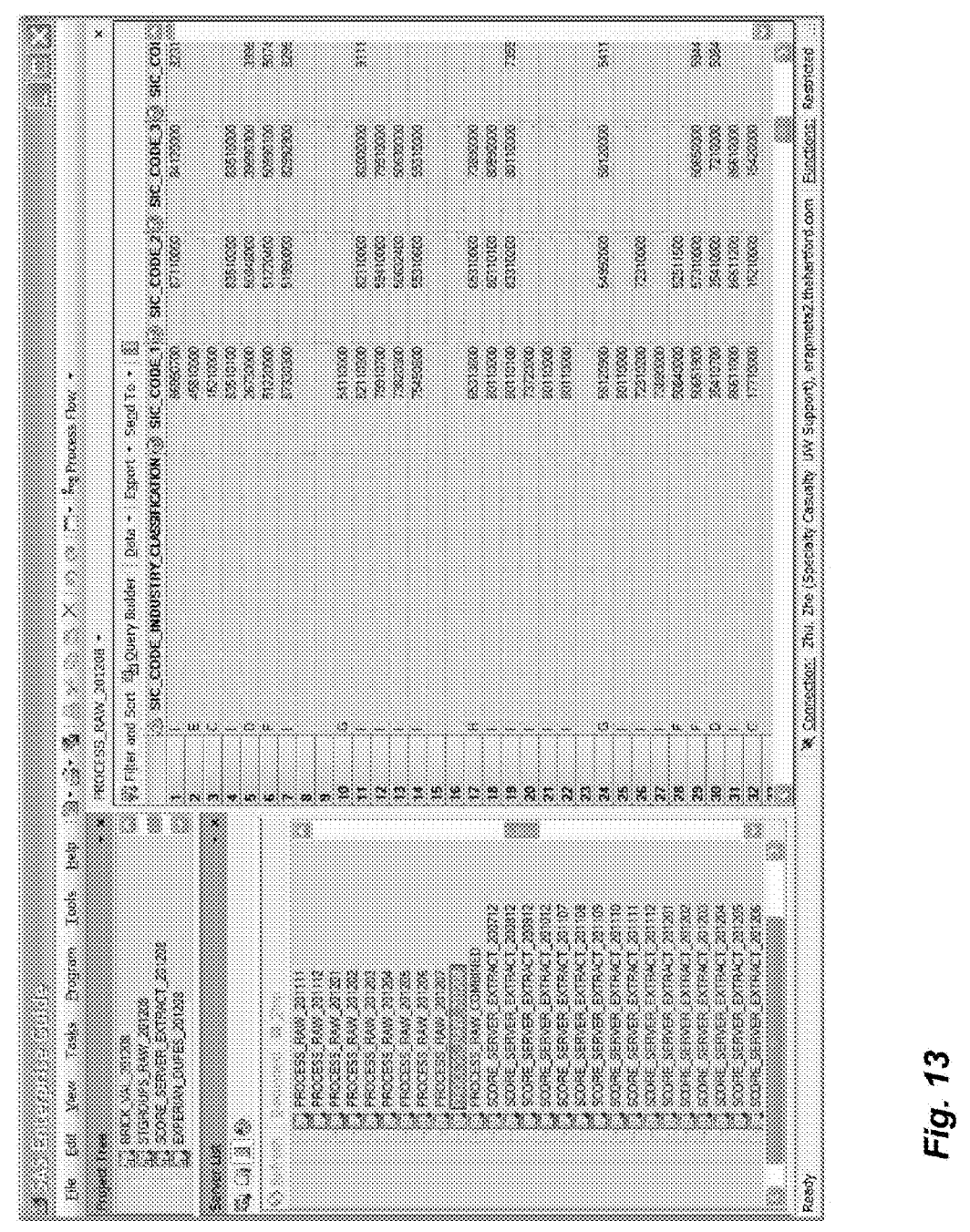

FIG. 13 shows an exemplary screen shot relating to Experian Brick Data, which provides over 40 million records with finer industry classification codes, which may be used for suitable purposes, such as model development and training.

Figure 14A:
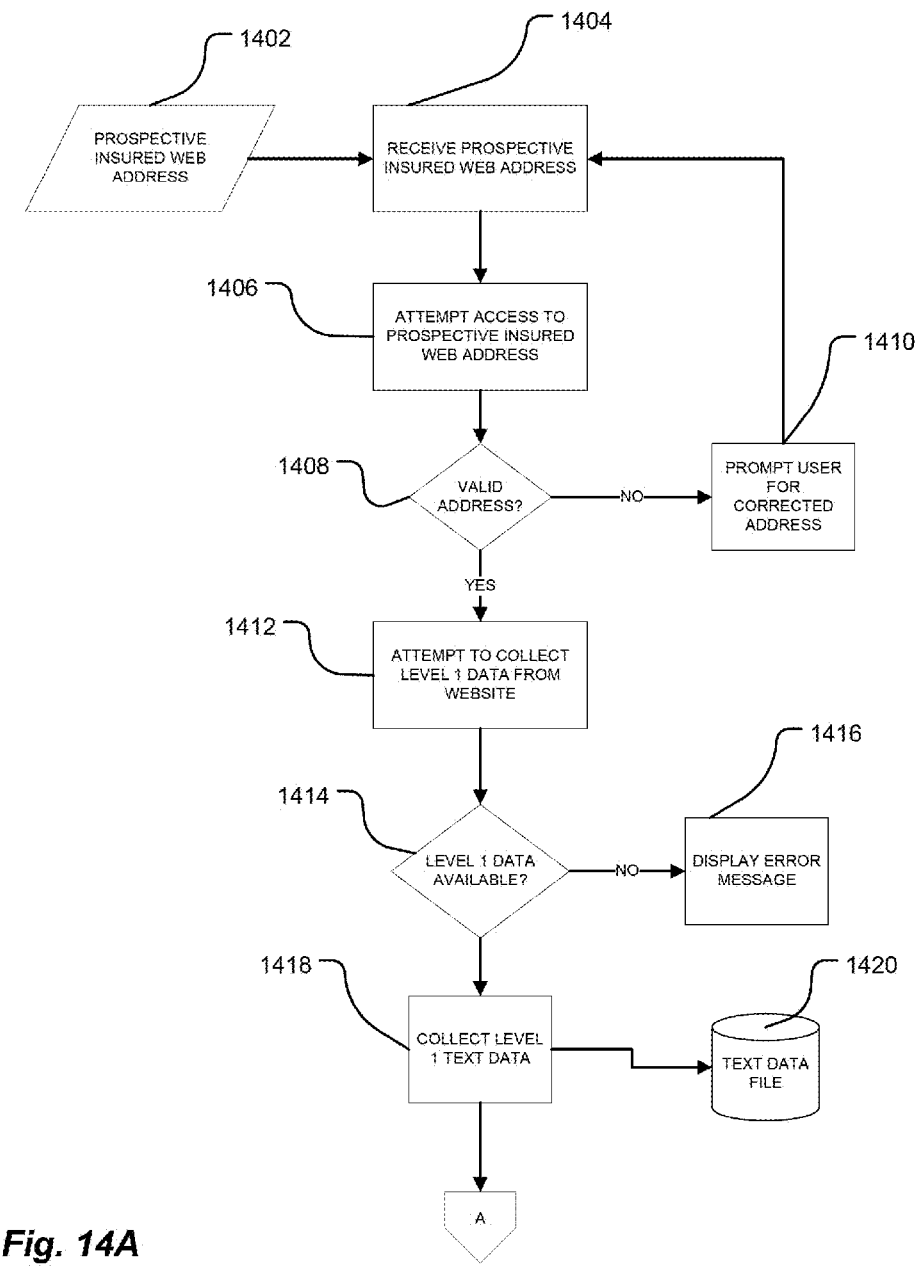
FIGS. 14A, 14B and 14C show an exemplary process flow of an embodiment of a method of determining industrial classification of an entity.
Figure 14B:
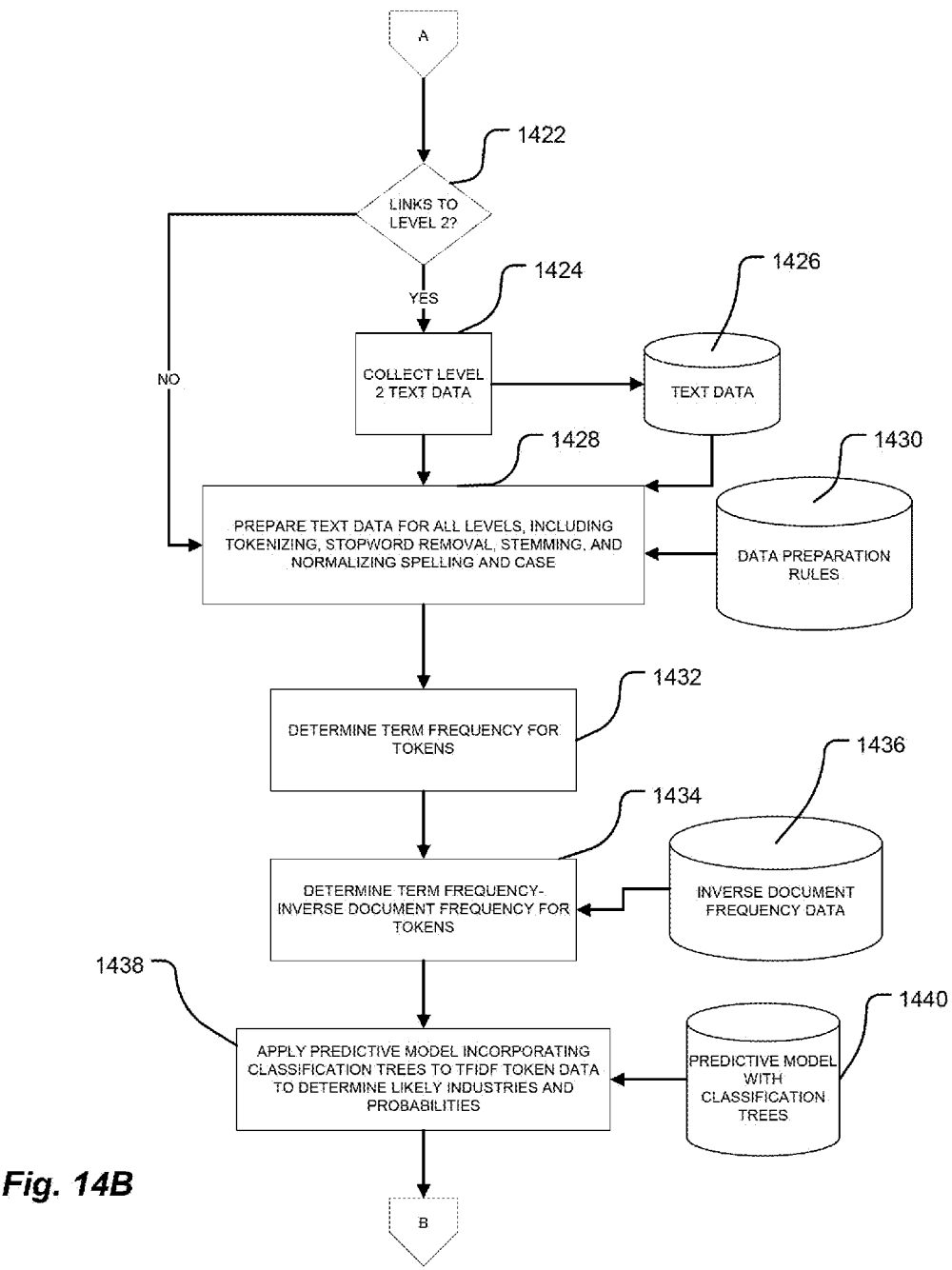
Figure 14C:
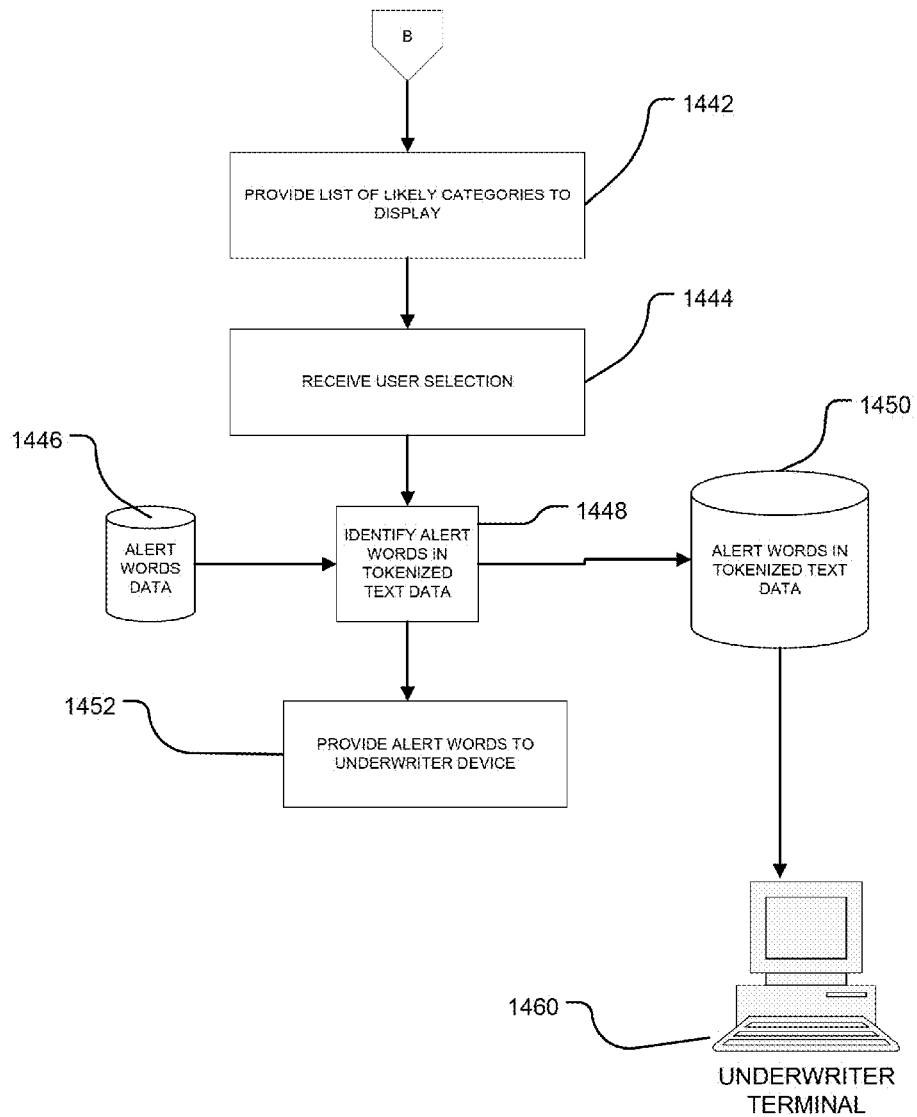

FIGS. 14A, 14B and 14C show an exemplary process flow of an embodiment of a method of determining industrial classification of an entity.

The process flow of FIGS. 14A, 14B and 14C may be performed by a suitable computer system such as the system described above with reference to FIGS. 1 and 2. In an initial step, data indicative of a website address 1402 of a prospective insured entity is received 1404. The data indicative of a website address may be a web address, or uniform resource locator (URL). In embodiments, the data may be indicative of content provided by the proposed insured in a social network, such as an address on any of the FACEBOOK, TWITTER, GOOGLE+, MYSPACE or other social networks. In embodiments, data relating to the insured entity may be obtained from any third party data source. The third party data sources may include in embodiments data from advertising sources, such as yellowpages.com, services providing ratings, such as Angie's List and Yelp, and other sources.

The system then attempts 1406 access to the provided prospective insured web address. The system may employ any suitable web scraping software for this purpose. This portion of the process flow may be performed by a web server distinct from a system processor. The web server may access and return to a system processor data extracted from the provided address. The system determines whether the provided address is valid. For example, there may be no content corresponding to the provided address. If the system determines that the address is not valid 1408, the process flow may proceed to a step of prompting 1410 the user for a corrected address. By way of example, the system may be configured to display indicating that the address is not valid and requesting entry of a corrected address, on a user screen display.

If the address is determined to be valid, the system may attempt 1412 to collect level 1 data from the website. This may be implemented by a web server executing web scraping or web crawling software. Level 1 data is data on a first level of a website, or a website home page or landing page. The system may evaluate whether level 1 data is available 1414, or whether sufficient data is available. For example, if the system is configured to collect only text data, and there is no more than a threshold minimum number of words of text data in Level 1, the system may display 1416 an error message indicating that the website does not have sufficient available Level 1 data available. In embodiments, the process flow may end at this point. In other embodiments, the process flow may continue with a prompt for alternative address information, for example. Similarly, if the system is configured to collect and convert to text static image data as well as text data, but the landing page of the website features data in video format, the system may be configured to provide an error message. In embodiments, the system may be configured to access static image data and video data as well as text data.

In an embodiment, if the system determines that accessing the website or other electronic resource is blocked by prohibitions on web crawling software, the system may proceed to check for user consent to website review. If consent has been obtained, then the system may proceed. If consent has not been obtained, then the system may generate a display of a consent screen having click or check approval of a consent for use of a webcrawler.

If the system determines that there is at least a threshold number of words in the level 1 data, the system proceeds with collection 1418 of the text data. The text data may be stored as at 1420 in a text data file in a data storage device. The text data may be stored without analysis in a file format including character data as obtained from the website, thereby preserving spacing and punctuation mark data as well as character data. The system may be configured to convert text data stored in image files, extracted from static image data, video, or both, to text using optical character recognition algorithms by way of example, and incorporate such converted text data as shown at 1420. In embodiments, the system may be configured to analyze sound files, using speech recognition algorithms, by way of example, and extract text data from such sound files and incorporate such extracted sound file data with text data at 1420.

Referring to FIG. 14B, the system may review 1422 the Level 1 data for links to Level 2 data. Level 2 data is the next level of web pages that are linked directly to a home page or landing page. A suitable algorithm may be employed to identify links to pages that are part of the same website maintained by the proposed insured, based on wording in the address, for example, as distinguished from links to websites not maintained by the proposed insured. If one or more Level 2 pages are identified, then the system may proceed to access and scrape text data 1424 from the Level 2 pages. Text data from Level 2 pages may be stored in a data storage device 1426 with text data from Level 1 or separately. In embodiments, more levels of the website may be accessed and the text data scraped. For example, if the number of words obtained from Level 1 and Level 2 combined is below a threshold value, then the system may access a third level of the website. In embodiments, other electronic resources, such as social media pages maintained by the proposed insured may be similarly accessed, and the system may extract text data from those other electronic resources. For example, social media addresses may be displayed on an entity website, and may be accessed from the entity website. Social media page data as well as social media feed data may be accessed. As social media feed data may be more current than website data, social media feed data may be more heavily weighted, such as by applying multipliers to token counts related to social media feed data. More recent social media feed data may be indicative of changing business areas and new risks associated with the business entity. Exemplary social media sites that may be accessed include Twitter, Facebook, Instagram and Google+.

The system may access data preparation rules 1430 and apply data preparation rules 1428 to all levels of the obtained data. The data preparation rules may include rules for tokenizing the data into individual words called tokens. "Tokenizing" refers to process of breaking a stream of text up into words, phrases, symbols, or other meaningful elements called tokens. In embodiments, tokenizing may break the text into individual words, but the tokens may include phrases or other meaningful elements in embodiments. Graphical data may be broken into tokens such as symbols and patterns recognized as particular types of images, such as images corresponding to types of products, equipment, devices and the like. Suitable image-recognition algorithms may be implemented in software for identification of items in images; the identified terms recognized by image recognition algorithms may be tokenized in the same manner as text data, by way of example.

The rules for tokenizing text may include rules that identify character strings bounded by spaces or punctuation as tokens. The tokenized data may be stored as a set of tokens. The data preparation rules may further include rules for stemming. Stemming may include modifying all words or tokens to a single part of speech, such as by removing endings such a the letter "s" and the letter strings "ing" and "ed" at the end of the words. The data preparation rules may further include rules for spelling normalization. The words may be checked against a database of words and changed to a nearest word as part of the normalization process. The rules may include capitalization normalization rules, so that any capital letters are consistently converted to lower case letters. The data preparation rules may include stop word removal rules. Stop words may be stored in a database and include words very commonly used but having little predictive value, such as conjunctions, such as "and," "but' and "or," and articles such as "the", "a" and "an." All stop words may be removed from the text data.

The resulting text data may be referred to as a tokenized data set. The system may determine 1432 term frequency for the tokens. The term frequency determination may include a count of the number of occurrences of each term in the tokenized data set. The system may then store in a file an association between each detected token and the number of occurrences of each token. This file represents the term frequency of the data.

The system may then access inverse document frequency data 1436. Inverse document frequency (IDF) data 1436 includes for each of a large number of words that may be used in websites, a value that reflects the frequency of use of the word in websites in general. Words that are frequently used in websites of different types of businesses have little predictive value and thus are weighted lower in determination of business type. For example, the term "copyright" appears in a very high percentage of websites, and thus has a low value. In an embodiment, the IDF for a term may be determined by log(total number of documents/number of documents containing the term). By way of example, for a term appearing 1000 times in a database of 10 million documents, the IDF=log(10,000,000/1,000)=4. Thus, for this relatively rarely appearing term, the term frequency value is multiplied by 4.

Each token that has a corresponding inverse document frequency value has a value assigned 1434 by multiplication of its term frequency by inverse document frequency to obtain a term frequency-inverse document frequency value (TFIDF) for each such token. The set of tokens and TFIDF values is stored in a file.

In embodiments, tokens generated based on image data and video data may be generated, and corresponding term frequency-inverse document frequency values obtained for such tokens. As discussed, such tokens may be based on image recognition algorithms to identify symbols, devices, equipment, clothing, characteristics of individuals, and other data. By way of non-limiting example, image recognition algorithms may identify images of vehicles on a web page of an appliance retailer; such identification data may be tokenized and processed to increase a likelihood that the appliance retailer has a delivery service in addition to a retail business. By way of further non-limiting example, image recognition technology may identify images of tractor-trailers on a web page of an entity stated to be a local delivery service; such image data may be tokenized and processed to increase a likelihood that the entity also provides long-distance hauling services. Similarly, images of vans and small trucks on an electronic resource of an entity stated to be a long-distance hauling service may be tokenized and processed to increase a likelihood that the entity also provides local delivery services.

The system then accesses a predictive model using classification trees 1440 stored in a memory storage device. The predictive model may use using the rotation forest technique or a predictive model using a modified version of classification trees. In some embodiments, because classification trees only split on one variable at each split in the tree, while in embodiments, the rotation forest technique uses a linear combination of variables at each splitting point. The predictive model is then applied 1438 to the TFIDF values and corresponding tokens. In embodiments, a predictive model employing classification trees may be applied to the TFIDF data to obtain a ranked listing of industrial classifications and associated probabilities that the classifications are accurate.

Figure 21:
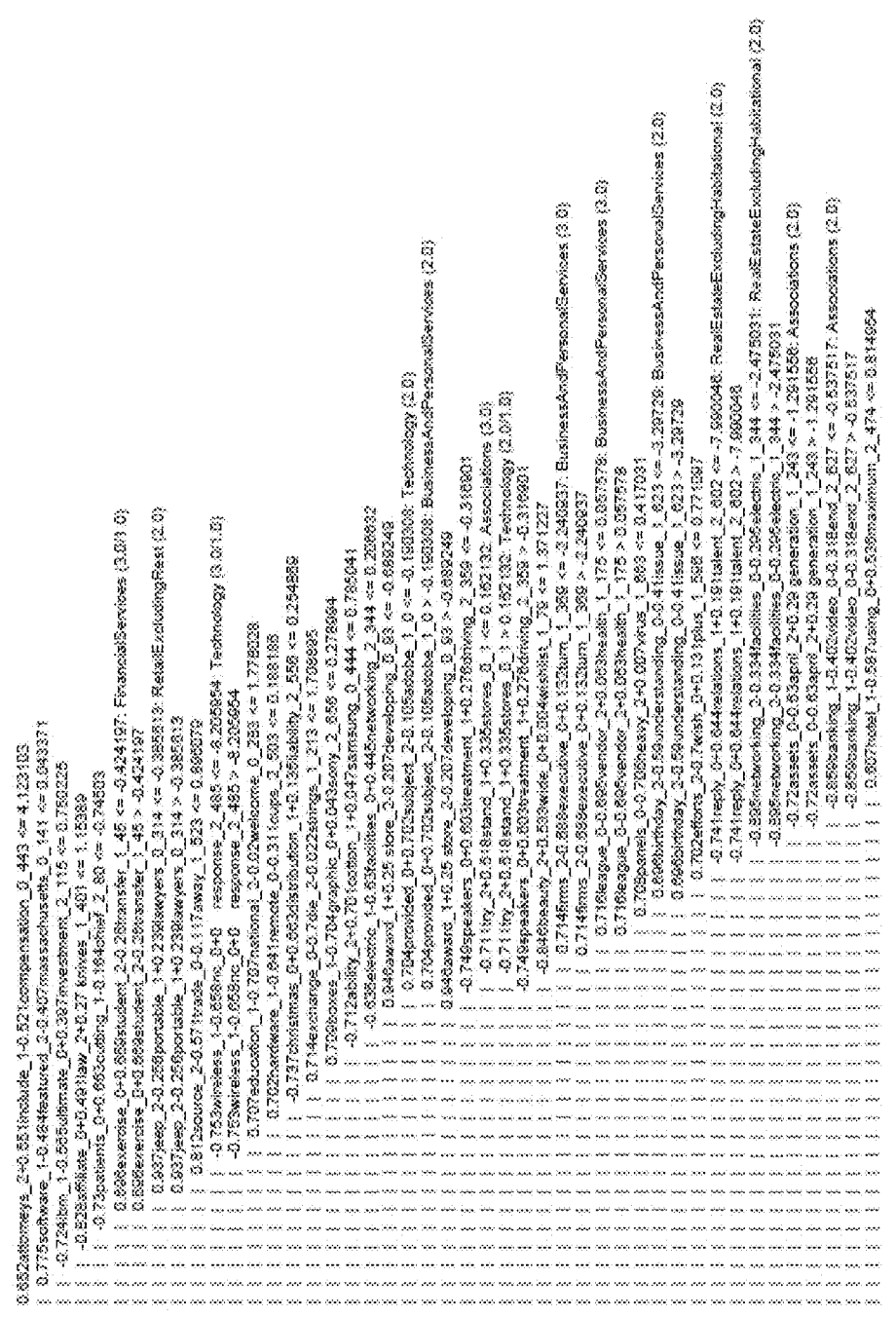

A predictive model incorporating classification trees may be accessed from memory by a system processor and applied to the TFIDF table. Classification trees include nodes connected by branches in a spreading pattern. Each node may define a binary rule for proceeding to one of two next nodes depending on a TFIDF value for a given term. Terminal nodes define two or more classifications and a confidence value associated with each classification. A predictive model of this type may have thousands of trees having in total tens of thousands or hundreds of thousands of terminal nodes. An example of a portion of a classification tree is shown in FIG. 21. Terms subject to rules and values of exemplary nodes are shown. Each token in a document that corresponds to a term in the predictive model contributes to the classification determination. The processing of each token by the classification trees is dependent on the associated TFIDF value. Thus, for two different websites, each having the same set of tokens, different classification results may be obtained from different token counts resulting in different TFIDF values operated on by the predictive model.

In the predictive model, each token and associated TFIDF value is processed through one or more trees, and the processing continues until a terminal node is reached. The results of the terminal nodes are then combined in a suitable manner to obtain a final listing of classifications and associated likelihoods.

An output of the system processor executing the predictive model includes two or more classifications and a probability value for each. The data may be provided to a web server for rendering a web page for display on a user devices, such as an agent or potential customer device. The web page may display 1442 first data including the two classifications, or more than two classifications, along with second data including the associated determined probabilities of the classifications. The web page may be configured to prompt the user to select one of the classifications. The web page may be configured to provide help text to assist the user in determining a proper classification. For example, the web page may be configured to, upon a pointer device being positioned over a classification, provide a popup box or other text box with text providing more information and examples to assist in the selection of a proper classification. Examples may include text providing, for a listed classification, examples of specific businesses that are properly classified in that classification.

Upon user selection 1444 of the classification, the selection data may be provided to further insurance company processing systems. For example, entity data may be provided to an underwriter terminal or a rating system for determination of a premium. An entity file may be provided with data including address and other data.

In embodiments, if the highest likelihood or confidence level falls below a threshold, the system may attempt to access further website levels or further electronic resources, such as seeking additional social media sites, associated with the entity. Upon identification of such additional levels or electronic resources, the process of obtaining text data, tokenizing, determining the TFIDF values, and application of the predictive model, may be repeated incorporating the additional data. Alternatively, the user may be prompted to provide the classification.

The system may further be configured to apply a list of insurance risk alert words or terms 1446 to the tokenized list of terms extracted from the entity website. The insurance risk alert terms may be terms that are selected as representing insurance risk and thus a likelihood of additional underwriting review being required. The insurance risk alert terms may include terms other than tokens employed in the predictive model, or terms overlapping with the predictive model. Insurance risk alert terms may include individual words and phrases. In embodiments, insurance risk alert terms may include image recognition data, such as image recognition of radiation hazard symbols, by way of non-limiting example. Identified alert terms may be stored 1450 in a file and made accessible 1452 to an underwriter terminal 1460 or otherwise accessible to an underwriting system. The alert terms may be provided in a listing having an order based on a risk weighting, frequency rating and combinations thereof. For example, certain insurance risk alert terms, such as "asbestos" and "isotope" may be given a high risk weighting and hence provided near a top of a list of insurance risk alert terms.

In embodiments, address and other data verification may be employed using data obtained from the prospective insured website. For example, an address may be identified in the text of the website, and compared to a stored address. Address data may also be employed for verification of number of sites.

Other data extracted from the website may be analyzed for determining inaccuracy or fraud in submitted data. For example, text data may be analyzed for indications of numbers of employees, period of time in business, and other data, and compared to data input by or on behalf of the proposed insured. Discrepancies may be identified in the comparison and analysis using suitable algorithms, and provided to an underwriter terminal as a fraud warning or fraud alert message or otherwise incorporated into the insurance evaluation. For example, a fraud risk may be incorporated into a premium pricing determination by increasing a premium price, or in a term of coverage determination, by reducing a term otherwise available.

Figure 15:
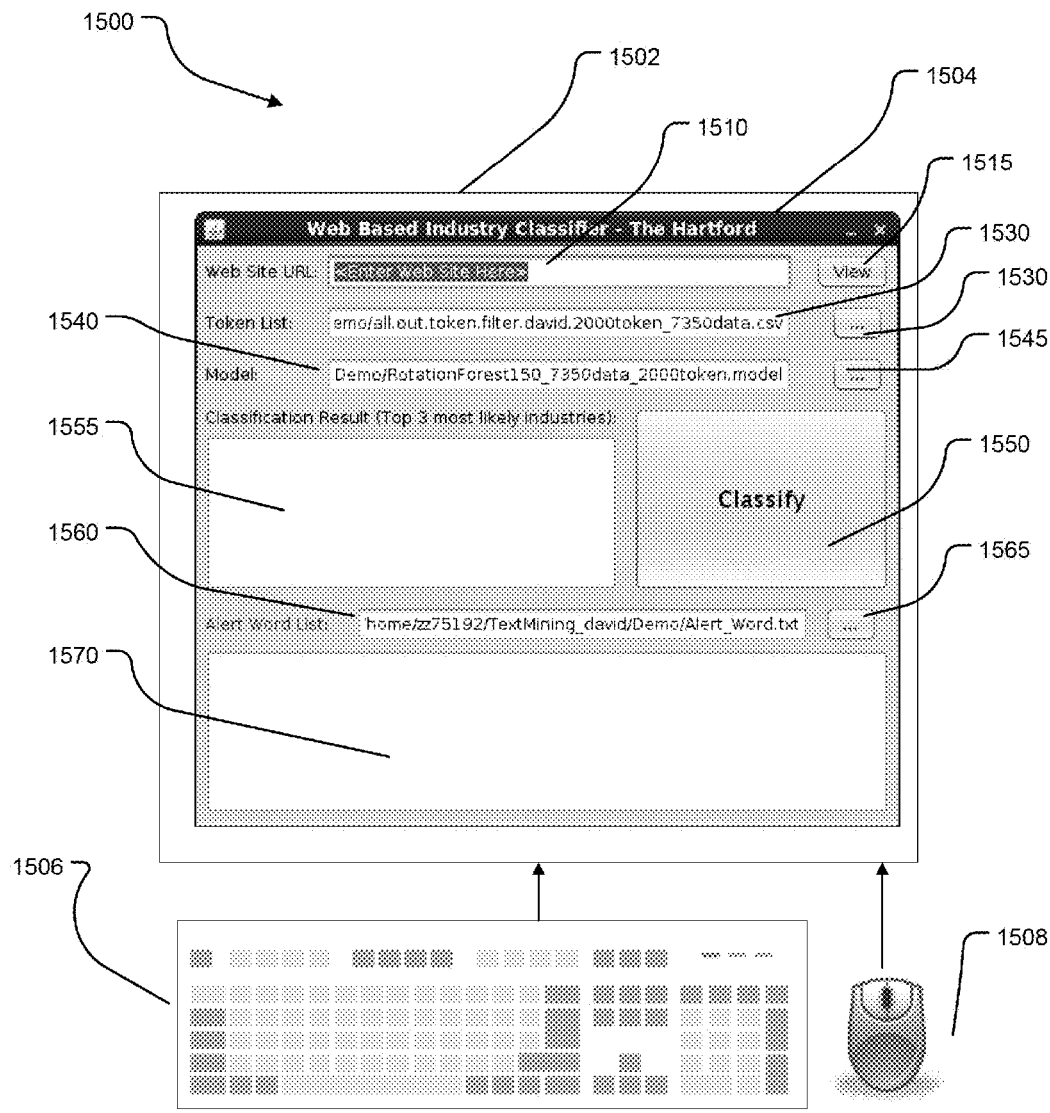
FIG. 15 shows a user device displaying a screen shot of a web interface generated by a web-based industry classifier system is shown.

Referring to FIG. 15, a user device displaying a screen shot of a web interface generated by a web-based industry classifier system is shown. The user device 1500 may be a user device of an insurance agent, an owner or other representative of an entity that is applying for insurance, or of an insurance company employee or contractors, such as an underwriter. The user device 1500 may be in communication with a web server system that generates the illustrated display, and, further in communication via the web server system with a system for determining entity classification based on obtaining entity electronic resource data, data preparation including tokenizing text data, removing stop data, generating token counts, applying token frequency data to token count data, and applying a predictive model to the token count data. The illustrated screen may be entirely browser based, or may be generated by one or more of a browser plug-in downloaded to the user device and executing together with client-side browser software, a stand-alone application downloaded or otherwise installed on the user device and executing on one or more processors of the user device. Display device 1502 shows screen 1504. Screen 1504 provides a prompt for a user to input via text input a website address for an entity 1510. User device 1500 has one or more user input devices, which in this illustration include physical keyboard 1506 and mouse 1508, but may include in embodiments any other input devices such as touch screens.

Figure 16:
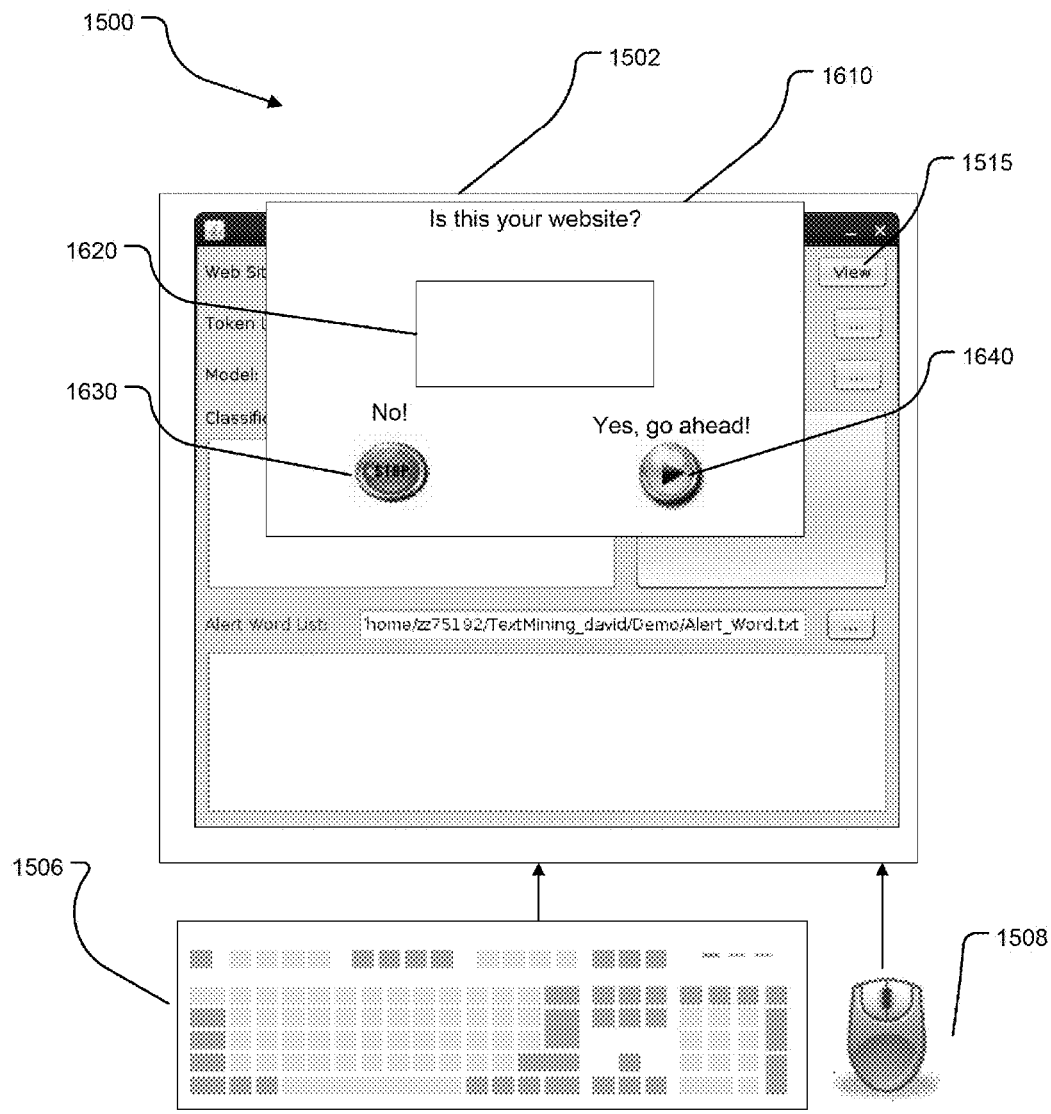
FIG. 16 shows the user device of FIG. 15 displaying an image of a selected entity website.

Screen 1504 includes a view button 1515. User selection of the view button 1515 serves as an instruction to the system to cause the client side browser or application to access the website at the entered address, and display the website, such as in a separate tab or window. In an embodiment, as shown in FIG. 16, the system is configured such that user selection of view button 1515 causes the system to overlay an image of the selected website along with a prompt to a user to indicate either that the image represents the user's website or does not represent the user's website. By way of example, as shown in FIG. 16, the system may be configured to provide a popup box over the 1610 over the screen display, the popup box 1610 including a box 1620 for display of the retrieved website. The popup box 1610 may further include a user option or button 1630 to indicate that the website is not the entity's website. Selection of user option 1630 may cause the redisplay of the screen of FIG. 15, to permit the user to correct the URL data. The popup box may include a user option or button 1640 to confirm that the website displayed in box 1620 is the entity's website. Selection of button 1640 causes the system to proceed with the process of accessing website data and determining classifications.

In embodiments, the system may be configured to, upon accessing a second level of a website, provide a display analogous to popup box 1610 to display at least a first image of the accessed second level screen and provide user options to confirm or deny that the displayed second level screen is part of the user's website. By way of example, the system may incorrectly identify a third party website linked from a home page as part of the user's website. Data indicative of a denial may be provided to an underwriter or used to increase a fraud risk value associated with the entity; for example, a denial may in fact be associated with a location or business operation that the entity is attempting to conceal from the insurer. Similarly, an image from a third party website or other resource, such as a review or advertising website, may be presented to the user for verification that the advertisement or reviews relate to the entity. In embodiments, two or more images from a second level screen, third party website or other electronic resources may be displayed along with user optiosn to confirm or deny that the displayed image relates to the entity.

The screen 1504 further displays a path 1530 or other identification of a document having a list of tokens. In embodiments, an input (here, button 1535) may permit a user to browse for selection of an alternate list of tokens. Such an option may be available in embodiments in which multiple token lists have been developed for application to entities having differing features other than classification. These features may include geographic location such as by state, region or city; entity size, by number of employees, revenue in a monthly period; and other factors. In embodiments, token list selection may be available only to a selected class of users, such as insurance company personnel, while other classes, such as entity representatives and agents, may not be able to select a token list.

Screen 1504 further displays a path or other identification of a statistical model 1540. In the displayed embodiment, the Rotation Forest statistical model is employed. Button 1545 permits a user to browse for and select an alternative statistical model. In embodiments, one or more of the displays and options for token lists and statistical models may be omitted.

Screen 1504 provides a user selection 1550, here a button labeled "classify," to permit the user to provide an instruction for the system to commence the process of accessing and analyzing entity website data to provide classifications. Screen 1504 is provided with an area 1555 for display of the determined classifications and their associated probabilities. Screen 1504 further displays at 1560 a path or other designation of a listing of insurance risk alert words to be applied to the website. Insurance risk alert words include terms that are selected for likelihood of additional underwriting review being required. In embodiments, a user may be provided with a selection of different listings of alert words. For example, multiple alert word lists may have been developed for application to entities having different characteristics, such as geographic location, entity size and other factors. Button 1565 may provide the user a selection of one of multiple such alert word lists. The user option for selection of alert word lists may be omitted in embodiments. Screen 1504 provides area 1570 for display of system-identified alert words to the user.

Figure 17:
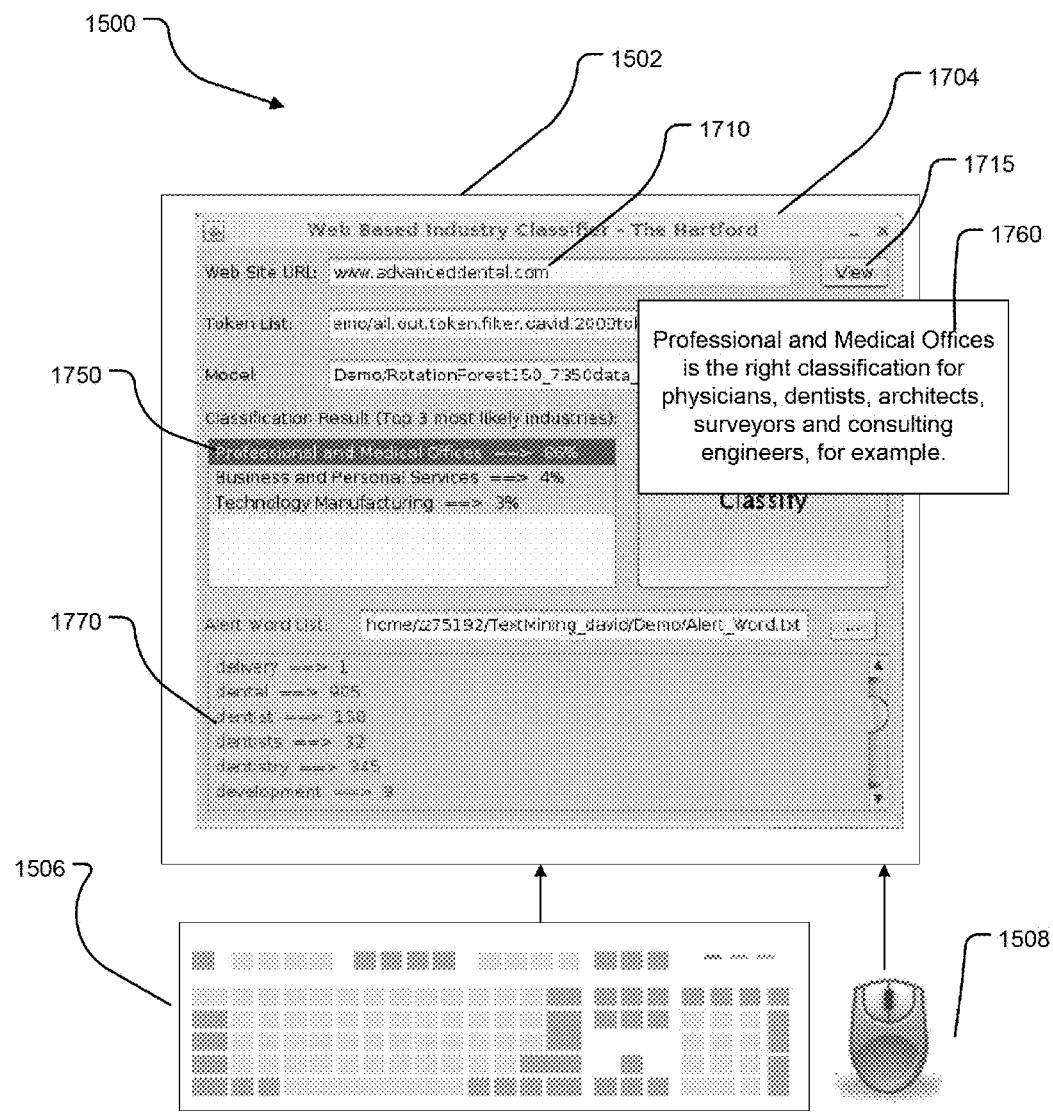
FIG. 17 shows the user device of FIG. 15 displaying a result of a web-based industry classifier system.

Referring now to FIG. 17, screen 1704 is shown displayed on display 1502 of user device 1500 after completion of determination of classifications. Screen 1704 includes on display area 1750 a listing of identified classifications and associated likelihoods, ranked in descending order of likelihood. In embodiments, more or fewer classifications may be provided, and alternative display arrangements may be provided. The system may generate popup box 1760 having explanatory text relating to one or more of the listed classifications, including text such as examples to assist in selection of a correct classification. Screen 1704 further displays in area 1770 identified alert words. Each alert word is identified with an identified number of occurrences. The alert word data is provided to an underwriting system or an underwriter for further analysis. The underwriting system may include a business logic processor configured to make an insurance evaluation of the entity. The insurance evaluation may include one or more of determining a premium, determining insurability, determining available coverages, determining coverages for recommendation or suggestion, determining a rating, and other insurance evaluations.

Figures 18, 20:
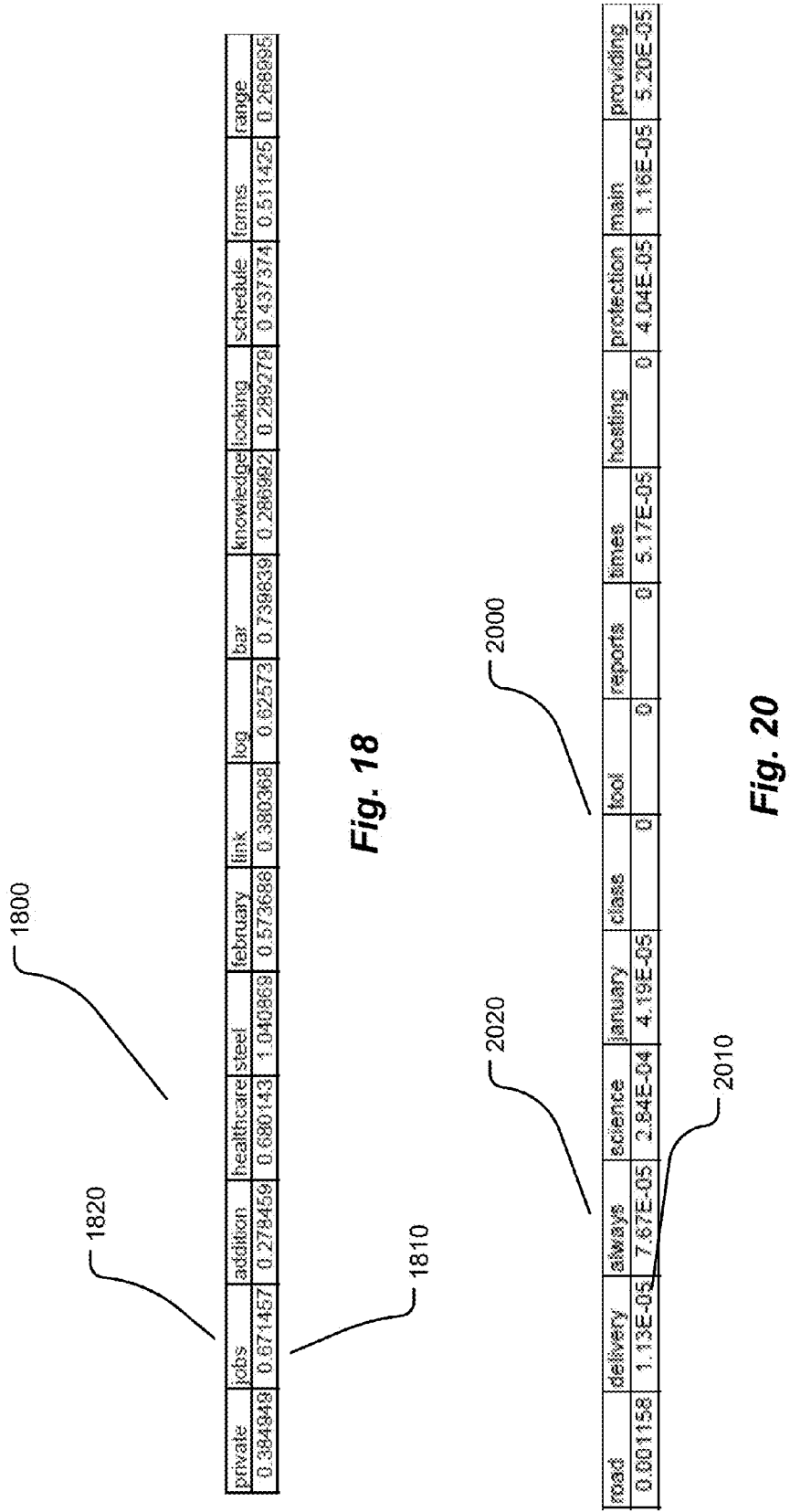
FIG. 18 shows an excerpt of a data table associating inverse document frequency values with tokens in a web-based industry classifier system.
FIG. 20 shows an excerpt of a data table associating token frequency inverse document frequency values for tokens extracted from an entity website.

Examples of data structures employed in the analysis of business websites will now be provided. Referring to FIG. 18, an excerpt of a data table 1800 is shown indicating inverse document frequency values in row 1810 associated with tokens in row 1820. As discussed above, the inverse document frequency values are applied to token frequency values to generate an input table for the predictive model. As can be seen in FIG. 18, the value associated with the term "looking" is relatively low, while the value associated with the term "steel" is relatively high.

Figure 19:
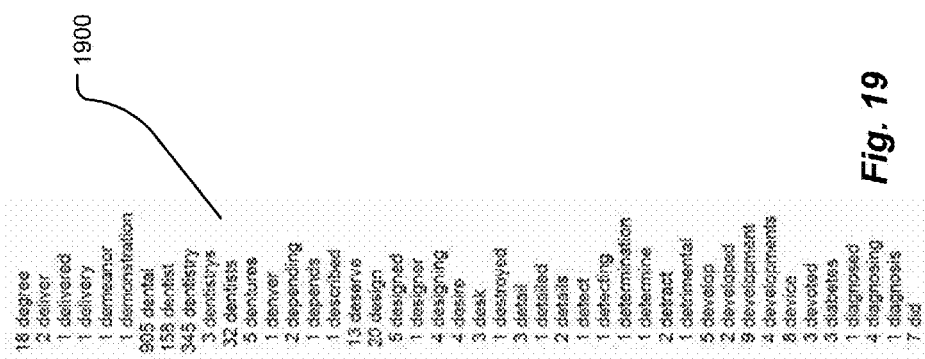
FIG. 19 shows an excerpt of token counts extracted from an entity website.

Referring to FIG. 19, an example of an excerpt of a token count 1900 from a website for a dentist's office. As may be seen, tokens relating to dentist and dentistry have very high counts.

Referring to FIG. 20, an excerpt of a data table 2000 is shown indicating exemplary token frequency-inverse document frequency values for a business. Tokens are shown in row 2020, and the values in row 2010. Certain of the tokens identified in the entity website were not identified in the inverse document frequency table and have been assigned a value of 0. Those tokens are not used by the predictive model. Other tokens have been assigned values based on their token counts and inverse document frequency values.

By way of example, the token "private" is identified in an entity website as occurring 5 times. The entity website has 37789 tokens. Accordingly, the token frequency for the term private is given by:

$$TF=5/37789=0.00013231363$$

The corresponding inverse document frequency value for the term "private" is taken from a table, such as that shown in FIG. 18, as 0.384949046682873. Accordingly, the TFIDF value for the token "private" is given by:

$$0.00013231363*0.384949046682873=0.000050934$$

The predictive model may be implemented using the rotation forest approach, as noted above. In an embodiment, the rotation forest predictive model may be built using one or more of the tools available from Waikato Environment for Knowledge Analysis (WEKA) suite of machine learning tools. These tools may be accessed at http://www.cs.waikato.ac.nz/ml/weka/. The pseudocode disclosed in Rodriguez, et al., may be employed, by way of example, in the training phase and classification phase of the rotation forest predictive model. Broadly, the rotation forest technique combines principal component analysis (PCA) with classification trees. PCA provides for orthogonal transformation to convert a set of possibly correlated variables into a set of values of linearly uncorrelated variables. Classification trees are then applied to the transformed data.

In an embodiment, 150 J48 trees (i.e. classification trees) from WEKA may be used. An example of a WEKA scheme is: weka.classifiers.meta.RotationForest -G 3 -H 3 -P 50 -F "weka.filters.unsupervised.attribute.PrincipalComponents -R 1.0 -A 5 -M -1" -S 1 -num-slots 40 -I 150 -W weka.classifiers.trees.J48—-C 0.25 -M 2. The resulting trees provide a large number of possible paths for each token and associated TFIDF value. The trees terminate in terminal nodes having industrial classifications and associated probability values.

Referring to FIG. 21, an example of a portion of a classification tree is shown. Coefficients associated with particular tokens may be seen, as well as values related to determining classifications and likelihoods.

The generation of a predictive model may use data based on up to 20,000 tokens.

Other types of ensemble classification models, such as bagging, boosting, and random forest may be employed in embodiments. Other classification model types, such as naïve Bayesian models, Bayesian network models, K-Nearest neighbor models and support vector machines, as well as classification trees not using the rotation forest or random forest technique may be employed.

In embodiments, the computerized predictive model may operate in real time, so that results are returned in real time to system users, such as insurance agents and underwriters and other insurance company personnel, within minutes of user initiation of the process. In embodiments, the system may be configured to perform classification determination using the predictive model in batch mode.

Steps of the methods performed herein may be performed in the order described in embodiments, or in other order, or with additional steps or with omission of one or more steps.

The methods described herein may be executed by one or more computer processors in communication with one or more data storage devices, display devices, user input devices, communication devices and other hardware devices. Such hardware devices may be co-located or location at more than physical location. In embodiments, cloud-based computing techniques, in which processing, communication and/or data storage are performed by use of third party processing, communication and/or data storage resources of third parties may be employed for one or more steps in the processes described herein.

Variations, modifications, and other implementations of what is described may be employed without departing from the spirit and scope of the disclosure. More specifically, any of the method and system features described above or incorporated by reference may be combined with any other suitable method, system, or device feature disclosed herein or incorporated by reference, and is within the scope of the contemplated systems and methods described herein. The systems and methods may be embodied in other specific forms without departing from the spirit or essential characteristics thereof. The foregoing embodiments are therefore to be considered in all respects illustrative, rather than limiting of the systems and methods described herein.

What is claimed is:

1. A system comprising:
   a web server configured to:
      obtain a web site address for an electronic resource corresponding to an entity seeking insurance coverage;
      responsive to obtaining the web site address, scraping, by a communications device from a server hosting the electronic resource corresponding to the web site address for the entity, content data corresponding to the entity;
   a content processor coupled to the web server and configured to:
      responsive to scraping the content data, tokenize the content data to identify the presence of terms having significance in industrial classification;
      responsive to tokenization of the content data, generate based on the tokenized content data, token count data corresponding to the number of occurrences of each of the terms having significance in industrial classification; and
      responsive to generation of the token count data, store the token count data in one or more data storage devices in communication with the one or more computer processors; and
   a predictive model processor coupled to the web server and content processor and configured to:
      responsive to the generation and storage of the token count data, apply the token count data to a trained predictive model trained to generate, based on the token count data, an industrial classification for an entity and a likelihood of the industrial classification being associated with the entity; and
      responsive to application of the trained computerized predictive model to the token count data, output first data indicative of the at least one industrial classification and second data indicative of the likelihood of the industrial classification being associated with the entity;
      wherein the web server is further configured to provide, by the communications device to a display device responsive to the output of the first data and the second data, a display including the first data indicative of at least one industrial classification and the second data indicative of a likelihood of the industrial classification being associated with the entity.

2. The system of claim 1, further comprising a processor configured to receive the first data indicative of at least one industrial classification and make an insurance evaluation of the entity based on the at least one industrial classification associated with the entity.

3. The system of claim 1, wherein applying the token count data to the trained computerized predictive model generates a plurality of candidate classifications and associated likelihoods, and wherein the web server is further configured to display the plurality of candidate classifications and associated likelihoods, to prompt the user to select one of the candidate classifications, and to receive a user selection of one of the candidate classifications.

4. The system of claim 1, wherein the content processor is further configured to identify one or more insurance risk alert terms from the electronic resource, and to transmit to an underwriting terminal the identified one or more insurance risk alert terms.

5. The system of claim 1, wherein the trained computerized predictive model implements the rotation forest technique.

6. The system of claim 1, wherein the web server is further configured to access at least a first and a second level of the electronic resource corresponding to the entity seeking insurance coverage.

7. The system of claim 6, wherein the first level of the electronic resource is a website and the second level of the electronic resource comprises a social media site.

8. The system of claim 1, wherein the web server is further configured to receive from a user an address corresponding to the electronic resource, access the electronic resource corresponding to the address, display at least a first image of the electronic resource on the user device, and prompt the user to confirm or deny that the image represents an electronic resource associated with the entity.

9. The system of claim 1, wherein the web server is further configured to structure the token count data using inverse document frequency data.

10. The system of claim 1, wherein the web server is further configured to compare address data collected from the web site with another source of address data for the entity, and to output a fraud warning based on a result of the comparison.

11. The system of claim 1, further comprising a quote generation processor configured to receive the first data and to generate an insurance quote based at least in part on the first data.

12. The system of claim 1, further comprising a processor configured to perform an insurance evaluation, wherein the insurance evaluation comprises at least one of an insurance risk, an insurance premium price, a level of underwriting necessary, insurance claims analysis, insurance marketing analysis, a number of employees, a geographic location and an actuarial class.

13. The system of claim 1, wherein the retrieved data comprises text data, and the tokenizing comprises breaking the text data into words.

14. A computerized method, comprising:
obtaining, by a web server, an electronic resource address related to an entity;
responsive to obtaining the electronic resource address, scraping, by a communications device from a server hosting the electronic resource corresponding to the electronic resource address for the entity, content data available at the electronic resource address and storing the retrieved content data in one or more data storage devices;
responsive to scraping the content data, tokenizing, by a content processor, the content data to identify the presence of terms having significance in industrial classification;
responsive to tokenizing the content data, generating, by the content processor based on the tokenized content data, token count data corresponding to the number of occurrences of each of the terms having significance in industrial classification;
responsive to generating the token count data, storing, by the content processor in the one or more data storage devices, the token count data;
responsive to the generation and storage of the token count data, applying, by a predictive model processor, a trained computerized predictive model to the token count data and generating, based on the application of the trained computerized predictive model, first data indicative of at least one industrial classification associated with the entity and second data indicative of a confidence level associated with the at least one industrial classification;
responsive to application of the trained computerized predictive model to the token count data, outputting, by the web server for display on a user device, the first data and a user prompt for confirmation of at least one of the one or more industrial classifications; and
receiving, by the web server, user confirmation of one of the one or more industrial classifications associated with the entity.

15. The method of claim 14, further comprising performing by a processor an insurance process relating to the entity based on the at least one industrial classification associated with the entity.

16. The method of claim 14, wherein the retrieved content comprises text, image and video content.

17. The method of claim 14, further comprising accessing data relating to the entity from one or more third party electronic resources and including the data accessed from the one or more third party electronic resources in the tokenized data.

18. A non-transitory computer readable medium having stored therein instructions for, upon execution, causing a processor to implement a method comprising:
obtaining a web site address corresponding to an electronic resource address related to an entity;
responsive to obtaining the web site address, scraping content data published on the electronic resource corresponding to the web site address;
responsive to scraping the content data, tokenizing the content data to identify the presence of terms having significance in industrial classification;
responsive to tokenizing the content data, generating token count data corresponding to the number of occurrences of each of the terms having significance in industrial classification;
responsive to the generation of the token count data, applying the token count data to a trained predictive model trained to generate, based on the token count data, at least first data indicative of one or more industrial classifications associated with the entity and second data indicative of a likelihood associated with each of the one or more industrial classifications; and responsive to application of the trained computerized predictive model to the token count data, outputting the first data and the second data to a display device.

19. The non-transitory computer readable medium of claim 18, wherein the instructions further cause the processor to:
identify one or more insurance risk alert terms from the electronic resource, and provide to an underwriting terminal the identified one or more insurance risk alert terms.

20. The non-transitory computer readable medium of claim 19, wherein the instructions further cause the processor to weight the identified one or more insurance risk alert terms, and display the identified one or more insurance risk alert terms in weighted order.

* * * * *